United States Patent
Hoffner et al.

(10) Patent No.: US 10,645,181 B2
(45) Date of Patent: May 5, 2020

(54) META BROKER FOR PUBLISH-SUBSCRIBE-BASED MESSAGING

(71) Applicant: SAP SE, Walldorf (DE)

(72) Inventors: Andreas Hoffner, Oestringen (DE); Dirk Sabiwalsky, Sandhausen (DE); Timur Fichter, Schwetzingen (DE)

(73) Assignee: SAP SE, Walldorf (DE)

( * ) Notice: Subject to any disclaimer, the term of this patent is extended or adjusted under 35 U.S.C. 154(b) by 212 days.

(21) Appl. No.: 15/376,540

(22) Filed: Dec. 12, 2016

(65) Prior Publication Data

US 2018/0167476 A1    Jun. 14, 2018

(51) Int. Cl.
*H04L 29/08*    (2006.01)

(52) U.S. Cl.
CPC .................... *H04L 67/26* (2013.01)

(58) Field of Classification Search
CPC ........................................................ H04L 67/26
See application file for complete search history.

(56) References Cited

U.S. PATENT DOCUMENTS

| | | | | |
|---|---|---|---|---|
| 6,310,878 B1 * | 10/2001 | Bodnar | | H04L 45/00 370/376 |
| 7,139,822 B2 | 11/2006 | Guenther et al. | | |
| 7,610,330 B1 | 10/2009 | Quinn et al. | | |
| 8,850,035 B1 * | 9/2014 | Vemulapalli | | H04L 67/10 455/404.2 |
| 9,009,230 B1 * | 4/2015 | Matthieu | | H04L 69/08 709/204 |
| 2003/0120785 A1 * | 6/2003 | Young | | H04L 29/06 709/228 |
| 2004/0003064 A1 * | 1/2004 | Astley | | H04L 67/306 709/223 |
| 2005/0256883 A1 | 11/2005 | Greaves et al. | | |
| 2009/0019124 A1 | 1/2009 | Reynolds et al. | | |

(Continued)

OTHER PUBLICATIONS

"IOT Standards and Protocols," www.postscapes.com/internet-of-things-protocols/, 15 pages, downloaded Dec. 9, 2016.

(Continued)

*Primary Examiner* — Andrew C Georgandellis
(74) *Attorney, Agent, or Firm* — Klarquist Sparkman, LLP

(57) ABSTRACT

A messaging meta broker gateway for publish-subscribe messaging environments can provide connectivity, message routing, and subscription management between large numbers of clients and large numbers of brokers. The messaging meta broker gateway can provide access to large numbers of brokers to a client through a single connection. To a broker, the messaging meta broker gateway provides extremely wide fan-in and fan-out to gateway clients. To a service provider, the messaging meta broker gateway is a single system providing easy scaling with lightweight replication of instances, and shared, private, or virtual messaging environments supporting multiple customers and applications. The meta broker gateway can also connect gateway clients with other clients of the brokers, and also with archiving facilities. Protocol translation, security, and statistics logging are supported. The messaging meta broker gateway is suitable for cloud-based Internet-of-Things environments.

19 Claims, 18 Drawing Sheets

(56) References Cited

U.S. PATENT DOCUMENTS

| | | | | |
|---|---|---|---|---|
| 2009/0182574 | A1* | 7/2009 | Beardall | G06Q 10/06 705/1.1 |
| 2011/0125823 | A1* | 5/2011 | Macken | G06F 9/542 709/201 |
| 2011/0131242 | A1* | 6/2011 | Bent | G06F 17/30545 707/770 |
| 2013/0238719 | A1* | 9/2013 | Gourevitch | H04L 51/14 709/206 |
| 2016/0191385 | A1* | 6/2016 | Lopez | H04L 69/166 370/392 |
| 2016/0277340 | A1* | 9/2016 | Mosko | H04L 67/2833 |

OTHER PUBLICATIONS

"Zato 2.0.7 documentation, Publish/subscribe introduction," zato.io/docs/pubsub/index.html, 2 pages, Nov. 25, 2016.

"Introduction: Kafka™ is a distributed streaming platform," Apache Kafka, kafka.apache.org/intro.html, 5 pages, downloaded Dec. 9, 2016.

Krebs, "Ecosystem," Apache Kafka, cwiki.apache.org/confluence/display/KAFKA/Ecosystem, 4 pages, Sep. 29, 2016.

Taylor, "Websphere MQ Primer, An Introduction to Messaging and WebSphere MQ," IBM Redpaper, www.redbooks.ibm.com/redpapers/pdfs/redp0021.pdf, 64 pages, Dec. 2012.

"Connect your world with IBM MQ V9.0.1," ibm.com, 7 pages, Nov. 2016.

"IBM MQ," www-03.ibm.com/software/products/en/ibm-mq, 3 pages, downloaded Dec. 9, 2016.

"OASIS: MQTT Version 3.1.1, OASIS Standard," docs.oasis-open.org/mqtt/mqtt/v3.1.1/os/mqtt-v3.1.1-os.html, 76 pages, Oct. 29, 2014.

"Persistence Service," SAP HANA Cloud Documentation, help.hana.ondemand.com, 3 pages, downloaded Dec. 10, 2016.

"SAP HANA Cloud Platform," SAP Store, www.sapstore.com/medias/SAP-HANA-Cloud-Platform-Overview.pdf, 32 pages, 2015.

"Comparing Solace's Broker-Based Messaging Architecture with Peer-to-Peer Architecture," Solace Systems, Inc., 3yecy51kdipx3blyi37oute1-wpengine.netdna-ssl.com/wp-content/uploads/resources/solace_brokered-vs-p2p.pdf, 15 pages, downloaded Dec. 9, 2016.

"Improve the Speed, Reliability and Scalability of Your ESB," Solace Systems, Inc., 3yecy51kdipx3blyi37oute1-wpengine.netdna-ssl.com/wp-content/uploads/resources/solace_esb-infrastructure.pdf, 6 pages, downloaded Dec. 9, 2016.

"Solace Messaging for Pivotal Cloud Foundry (Beta)," Solace Systems, Inc., docs.pivotal.io/solace-messaging/, 3 pages, downloaded Dec. 9, 2016.

* cited by examiner

META BROKER FOR PUBLISH-SUBSCRIBE-BASED MESSAGING

FIELD

The field relates to publish-subscribe-based messaging technologies.

BACKGROUND

Messaging is widely used in a wide variety of fields for communication among devices and host applications. Publish-subscribe is a prevalent messaging paradigm. With the advent of Internet-of-Things phenomena, requirements of scale, cost, interoperability, and multiple concurrent applications cannot be met with current technology. Accordingly, there remains a need for improved messaging technologies in publish-subscribe environments.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a method comprises establishing a plurality of connections between a messaging meta broker gateway and respective messaging meta broker clients; responsive to receiving a first subscription request having a specified topic identifier from a first requesting messaging meta broker client over one of the connections, sending a subscription request from the messaging meta broker gateway to one or more message brokers on behalf of the requesting messaging meta broker client; responsive to receiving, from a subsequent requesting messaging meta broker client, a subsequent subscription request having a same topic identifier as that specified in the first subscription request, adding the subsequent subscription request to a subscription mapping repository in lieu of sending a subscription request to any message broker for the subsequent subscription request; responsive to receiving a published message from the one or more message brokers within scope of the specified topic identifier, fanning the published message out to a plurality of subscribing messaging meta broker clients indicated by the subscription mapping repository, wherein the plurality of subscribing messaging meta broker clients comprise the first requesting client and the subsequent requesting client; receiving a plurality of published messages from the messaging meta broker gateway clients, wherein the published messages comprise respective topic identifiers; and routing the plurality of published messages among a plurality of message brokers connected to the messaging meta broker gateway by the topic identifiers according to a topic mapping repository.

In another embodiment, a computer-implemented meta broker gateway system for publish-subscribe messaging comprises a plurality of computing nodes comprising one or more processors and memory coupled thereto; a topic mapping repository shared among the plurality of computing nodes; a plurality of internal network connections between the computing nodes; respective ones of the plurality of computing nodes hosting respective instances of a messaging meta broker gateway. Each instance comprises a messaging meta broker gateway client-facing protocol adapter subsystem comprising a plurality of protocol adapters supporting respective messaging meta broker gateway client protocols, each protocol adapter being configured to support one or more messaging meta broker gateway client connections according to the respective client protocol; a broker-facing interface subsystem comprising a plurality of broker adapters supporting respective messaging protocols, each broker adapter being configured to support one broker connection according to the respective broker protocol; a publish-subscribe subsystem comprising a subscription mapping repository; a publish engine configured to route published messages received over the messaging meta broker gateway client connections to corresponding broker adapters according to the topic mapping repository; and a subscribe engine configured to route subscribed messages received over the broker connections to corresponding messaging meta broker gateway client connections according to the subscription mapping repository; and a subscription management engine configured to receive subscription requests forwarded from the messaging meta broker gateway client connections by the messaging meta broker gateway client-facing protocol adapter subsystem, and selectively forward subscription requests to broker adapters at least partly based upon access to the topic mapping repository and the subscription mapping repository.

In another embodiment, one or more non-transitory computer-readable media store instructions that, when executed by a computing system, cause the computing system to perform a method comprising accepting a plurality of first connection requests from respective client devices; establishing a plurality of concurrent client connections for the first connection requests; initiating a plurality of connections to a messaging backbone comprising one or more message brokers and one or more big-data repositories; configuring a topic mapping repository with entries comprising associations between (a) one or more topics and/or topic patterns, and (b) respective messaging meta broker destinations, wherein the messaging meta broker destinations comprise one or more of the message brokers or big-data repositories; initializing a subscription mapping repository; receiving a first published message from a first client device using a first messaging protocol over a first client connection among the concurrent client connections, the first published message having a first topic; accessing the topic mapping repository to determine, based at least partly on the first topic, at least one message destination for the first published message, from among the messaging meta broker destinations; forwarding the first published message to the at least one message destination; wherein forwarding includes translating the first published message from the first messaging protocol to a different second protocol for compatibility with one or more of the message destinations; receiving, from a second client device, a second subscription request comprising a second topic pattern and identifying the second client device as a subscriber; accessing the topic mapping repository to determine one or more sources hosting a second topic matching the topic pattern, from among the one or more message brokers; and issuing one or more subscription requests to the one or more sources.

As described herein, a variety of other features and advantages can be incorporated into the technologies as desired.

DETAILED DESCRIPTION

I. Overview

Figure 1:
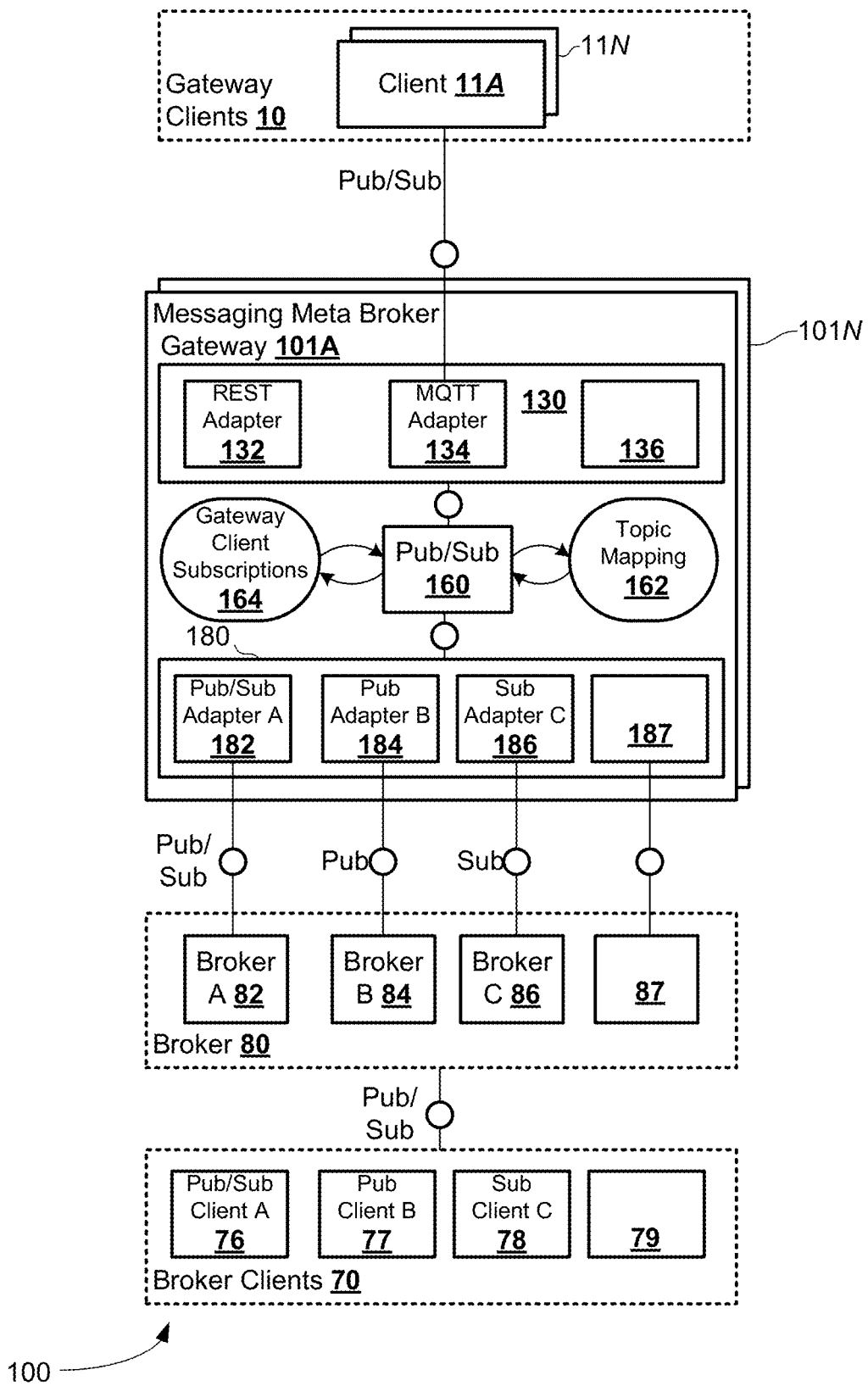
FIG. 1 is a block diagram of an example messaging gateway in a publish-subscribe messaging environment.

Publish-subscribe messaging environments can implement any of a variety of message broker types, having respective strengths and varying fitness for different purposes. Different types of message brokers can be limited in protocol compatibility and connection capacity. Accordingly, there is a challenge to bring the right messages in the right format to the right message brokers in a considerably heterogeneous messaging environment. Furthermore, with the advent of Internet-of-Things (IoT), anticipated scales of operation dwarf the capabilities of current systems.

Furthermore, messages can require delivery to multiple brokers for different purposes. One broker type can be well-suited to feeding messages into a big-data archive, while another broker type can be well-suited to feeding messages to multiple mid-scale databases for access by applications and analytic tools. A third broker type can excel at low-latency routing of alert messages, while a fourth broker can have an attractive suite of queueing and QoS features for dedicated handling of more valuable messages. Such a situation presents an unpalatable choice between compromising on a broker which can be inferior for an important purpose, or supporting costly redundant infrastructure and publishing redundant messages in order to fulfill requirements.

A software-based meta broker called a "messaging meta broker gateway" can address such problems, and can be offered at low cost and easy extensibility in a cloud service solution. The software-based meta broker gateway can simultaneously connect to multiple brokers (e.g., of different types) and can route messages to any one or more connected brokers, allowing a single published message from a client to be efficiently distributed to multiple and disparate consumers. The software-based meta broker gateway can support a range of client-facing endpoints, thereby allowing many client types to connect to a single publish-subscribe messaging environment. Supported protocols can include MQTT, MQTT-over-WebSocket, AMQP, REST, and the like. The software-based meta-broker gateway can also support a range of broker adapters to offer compatibility with many broker types, which can include Kafka, Solace, RabbitMQ, and the like. With appropriate adapters, the software-based meta broker can also interface directly with consume-only message repositories such as a big-data archive.

The meta broker gateway can process incoming client-published messages using a topic router to distribute the messages to the right brokers. The routing can be done based on topics of the messages based on a topic mapping as described herein. For example, if an incoming message has a topic that matches multiple entries in the mapping, then the message can be correspondingly forwarded to multiple brokers.

The meta broker gateway can manage multiple concurrent broker connections and can multiplex client-published messages among the brokers. The meta broker gateway clients can share a single connection—regardless of client and broker protocols—between the meta broker and a broker, thereby greatly easing load on the broker. Protocol translation can be performed at one or both of a client endpoint and a broker adapter.

Client subscriptions to various topics can be received and managed by the meta broker gateway. The subscriptions can be processed by a meta broker topic router that forwards the subscriptions to the matched brokers and subscribes on behalf of the gateway clients.

In some examples, there is a single subscription request from the meta broker to a broker for a particular topic, regardless of how many gateway clients are subscribed to the topic. In such examples, the broker sees that the meta broker gateway is the subscriber to the topic. The meta broker maintains records of which clients are subscribed to which topics in a subscription mapping repository, so that messages of subscribed topics (denoted in this disclosure as "subscribed messages" for brevity) can be correctly forwarded to the subscribing clients. For example, if the broker transmits a message just once to the meta broker gateway, the meta broker gateway can then forward the message separately to various subscribed clients over their respective client-side connections. The broker load is greatly reduced.

In other examples, a broker can host dedicated client queues for one or more clients. In some examples with dedicated queues, the broker can hold the client subscription information and populate the client's queue as published messages arrive, and retain such messages until the client is able to receive its subscribed messages. The broker transmits the message multiple times (once for each client queue) through the meta broker gateway, for delivery to the client. Protocol translation is still provided by the meta broker gateway at one or both of the broker adapter and the client endpoint. In some examples, messages can be published directly to a queue, which enables peer-to-peer functionality over a publish-subscribe message system.

II. Advantages

Possible advantages that can be provided by the meta broker gateway as described herein include the following:

Client fan-in/fan-out. A large number of client connections can be multiplexed over a single broker connection. The overhead of managing large numbers client connections is off-loaded from brokers.

Concurrent connections to multiple brokers. Using a topic mapping repository, a topic router can forward a single published message or subscription request to multiple brokers or appliances.

Protocol interoperability. Plug-in or integrated protocol adapters at client endpoints and/or broker adapters can enable extensible protocol support.

III. Example Messaging Gateway System

FIG. 1 is a block diagram of an example messaging gateway in a publish-subscribe messaging environment. The messaging meta broker Gateway 101A provides connectivity between clients on the client-side, and brokers, a backbone, or other appliances on the broker-side. The messaging meta broker gateway 101A can be realized as an application, a service, computer-readable media, and/or localized or distributed computing hardware, together with network or other internal and/or external connectivity. For purposes of brevity, a messaging meta broker gateway is sometimes simply called a "meta broker," a "messaging gateway," or simply a "gateway."

On the client-side, the client interface layer 130 provides one or more interfaces for clients operating according to various protocols. Supported client protocols can include MQTT (Message Queuing Telemetry Transport) via MQTT Adapter 134, REST (REpresentational State Transfer) via REST Adapter 132, or other protocols via other adapters generically indicated as 136. Other protocols can include MQTT over WebSocket AMQP (Advanced Message Queuing Protocol), OpenMAMA (Open Middleware Agnostic Messaging API), STOMP (Streaming Text-Oriented Messaging Protocol), any variants or derivatives, and/or other open, proprietary, or standard protocols. Thus, interoperability between clients operating according to different protocols can be implemented by the messaging gateway 101A, however support for multiple client protocols is not a requirement of the disclosed innovations.

Interoperability of protocols can be implemented in different ways in different examples, or even within a single example. In some examples, the messaging gateway 101A does not support interoperability of protocols. In some examples, only a single messaging protocol could be supported system-wide, so that no protocol translation is required. In other examples, the publish-subscribe engine 160 can support a group of two or more messaging protocols, the client and broker connections can be limited to this group of messaging protocols, and no protocol translation need be done. In further examples, protocol translation can be done in one or both of the broker interface layer 180 and the client interface layer 130. In some examples, the messaging gateway 101A comprises protocol factories (not shown in FIG. 1) for one or both of the broker interface layer 180 and the client interface layer 130, thereby enabling live extensibility of the Messaging Gateway 101A to dynamically add adapter types and protocol translations.

On the broker-side, the broker interface layer 180 can provide one or more interfaces for brokers and appliances of various types and operating according to various protocols. The publish/subscribe adapter 182 can support a Pub/Sub interface to broker A 82, whereby the messaging gateway 101A can publish messages to broker A 82 and also subscribe to messages from Broker A 82. (For ease of description, "pub" and "sub" are sometimes used to abbreviate "publish" and "subscribe," respectively.) Other adapters or interfaces can support unidirectional messaging capabilities. The publish adapter 184 can publish messages to broker B 84 via a Pub interface, but, in the example shown, is not able to subscribe to messages from Broker B 84. Conversely, the subscribe adapter 186 can subscribe to messages from Broker C 86, but, in the configuration shown, is not able to publish messages to Broker C 86. Other adapters 187 can also be connected to other brokers and appliances. In some examples, a broker can have additional messaging interfaces (not shown) to other entities besides the Messaging Gateway 101A. For example, Brokers A 82 or B 84 can receive published messages through Messaging Gateway 101 from clients 11A-11N, and can provide them directly or indirectly to external subscribers 76 or 78. For example, Brokers B 84 or C 86 can receive published messages directly or indirectly from external entities 76 or 77, and provide them through Messaging Gateway 101A to clients. Besides supporting message brokers 82, 84, 86, the broker layer 80 (sometimes, a backbone layer) can also support other appliances. In some examples, the messaging gateway 101 can be connected to a big-data repository through a broker adapter and interface. Such a repository can be used for archiving messages, and can lack support for subscriptions to message topics. While many different combinations and arrangements of brokers are possible, the disclosed innovations do not have any particular requirement as to appliance type, broker type, number of brokers, interfaces, adapters, protocols, or other parameters associated with the broker layer 80. The disclosed innovations can be used with even just a single appliance in broker layer 80 with even just a unidirectional messaging capability. In some examples, broker adapters can translate message protocols to or from connected broker appliances.

The publish-subscribe engine 160 performs forwarding and routing functions of the messaging gateway 101. Published messages from one or more of clients 11A-11N can be received at the engine 160 via the client interface layer 130. As described further below, a published message includes a topic. Engine 160 accesses the topic mapping repository 162 to determine, based on the topic, which broker or brokers should receive this message. Once the destinations are determined, the message can be routed to the corresponding adapter in the broker interface layer 180, and thence to the corresponding attached broker or appliance in the broker layer 80.

Multiple mapping entries can match a single topic, and a single message can be routed to multiple message broker or appliance destinations as described herein.

The publish-subscribe engine 160 can also route subscribed messages received from the broker layer 80 to gateway client subscribers. The subscribed message includes a topic, which can be (but need not be) the same topic associated with the message when it was published. The engine 160 accesses a subscription mapping repository 164 to determine which client subscribers have subscribed to the topic of the subscribed message, and forwards the subscribed message appropriately, through client interface layer 130, as described herein.

The gateway clients 11A-11N can also issue subscription requests. Some clients can be only publishers, some can be only subscribers, while others can both publish messages and subscribe to topics. Thus, the engine 160 can also receive subscription requests via client interface layer 130. Subscription requests can be routed to appropriate brokers based on the requested topic or topics. A subscription request need not be limited to a single topic, but can include topic patterns, including wild cards. Thus, a single subscription request can match multiple topics, and can lead to requests being forwarded to multiple brokers or appliances.

In certain examples, the forwarded subscription request can have its client subscriber identifier replaced with an identifier of the messaging gateway 101A itself. Thus, the broker receiving a forwarded subscription request can register the messaging gateway 101A as a subscriber for the topic, rather than the original client subscriber. Such an approach can have various implications. First, not all subscription requests from the gateway clients 10 will generate a forwarded subscription request. For example, if client A has subscribed to topic X, resulting in messaging gateway 101A subscribing to topic X, then a subsequent subscription to topic X from client B need not be forwarded, because messaging gateway 101A is already subscribed to topic X.

However, in some examples, client B's subscription can be forwarded anyway. This can be beneficial in examples where subscriptions have associated lifetimes, so that client B does not lose its subscription when client A's subscription expires.

A second implication is that the messaging gateway 101A can be responsible for routing messages of subscribed topics to the appropriate client. For such purpose, the messaging gateway 101A can maintain a subscription mapping repository 164 that associates topics and/or topic patterns with subscribing clients. The subscription mapping repository 164 can be updated as subscription requests are received, and the mapping 164 can be accessed to route messages from broker layer 80 to correct client destinations.

In some examples, client interfaces and broker interfaces can be implemented as network connections using any protocol or protocol stack, such as TCP/IP, over any kind of network, such as wired, wireless, or optical. In other examples, the messaging gateway 101A can be integrated with one or more brokers, appliances, and/or clients, so that all or part of client connections or broker connections can be in software or over local physical interconnections.

Although the discussion above has focused on a single messaging gateway 101A, publish-subscribe environment 100 can support a plurality of messaging gateway instances 101A-101N as shown. Multiple instances of messaging gateways can operate with varying degrees of autonomy, collaboration, or synchronization, as discussed further below.

The described computing systems can be networked via wired or wireless network connections. Systems can be connected through a global network (e.g., Internet) or an intranet connection (e.g., in a corporate environment, government environment, educational environment, research environment, or the like).

The system 100 and any of the other systems described herein can be implemented in conjunction with any of the hardware components described herein, such as the computing systems described below (e.g., one or more hardware processors, processing units, memory, and the like). In any of the examples herein, the subscription mapping repository, topic mapping repository, and the like can be stored in one or more computer-readable storage media or computer-readable storage devices. The technologies described herein can be generic to the specifics of operating systems or hardware and can be applied in any variety of environments to take advantage of the described features.

IV. Example Messaging Gateway Method

Figure 2:
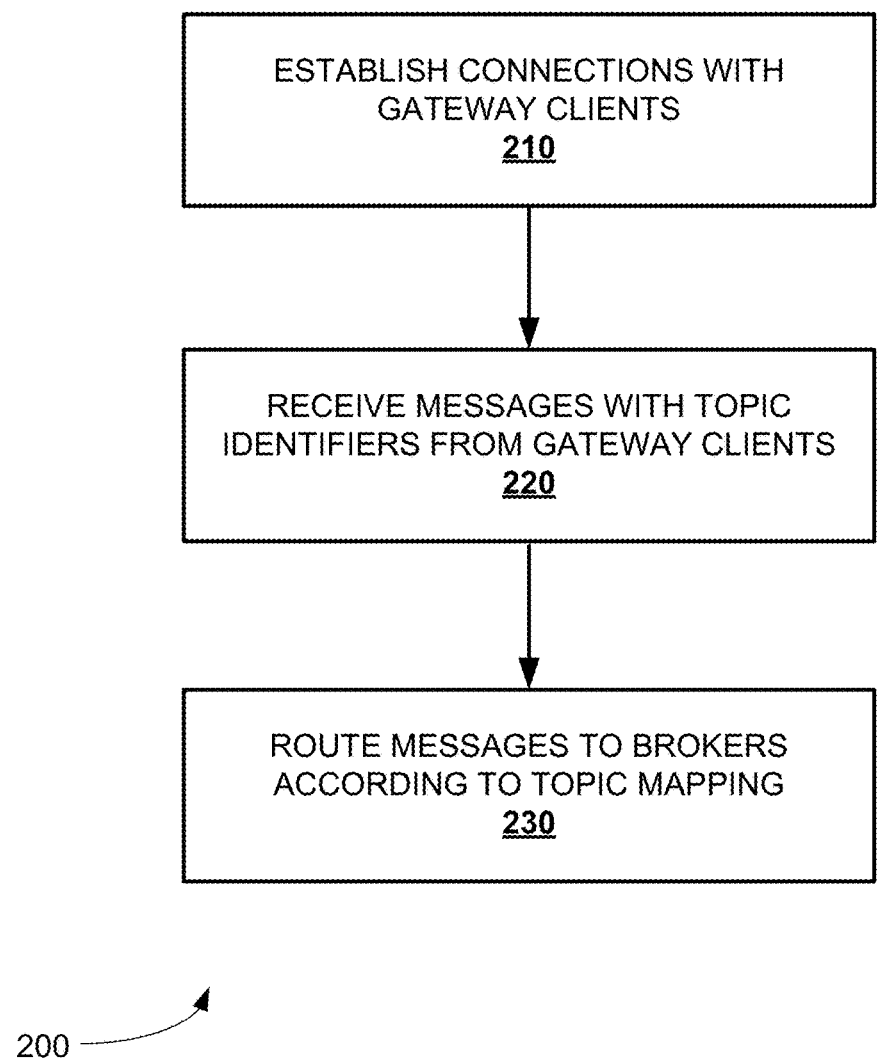
FIG. 2 is a flowchart of an example method of operation of a messaging gateway.

FIG. 2 is a flowchart of an example method of processing messages from gateway clients and can be performed by any of the systems described herein. Although the method is described as being performed by a single gateway, in practice a plurality of gateways can cooperate to scale processing out horizontally across a large number of gateway clients. For the purpose of illustration, the method of FIG. 2 is described with reference to some exemplary entities shown in FIG. 1.

At 210, a messaging meta broker gateway (e.g., 101A-101N) accepts connection requests from one or more of gateway clients such as 11A-11N, and proceeds to establish respective client connections.

At 220, the messaging gateway 101A-101N receives published messages from one or more of the connected gateway clients such as 11A-11N. Such messages have respective topic identifiers as described herein.

The messaging gateway (e.g., 101A-101/V) can access a topic mapping repository (e.g., 162) to determine which brokers or appliances each message should be forwarded to, based on topic mapping records and at least partly on the message topics. At 230, the messaging gateway (e.g., 101A-101/V) routes the published messages to their destinations according to the records in the topic mapping repository. For example, if the Broker A 82 and the appliance 87 are configured to host message topic "apple," and the Broker B 84 is configured to host message topic "orange," then messages having topic "apple" will be routed to Broker A 82 and appliance 87, while messages having topic "orange" will be routed to Broker B 84, regardless of the originating client or by which gateway instance the message is processed.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

In any of the technologies described herein, the illustrated actions can be described from alternative perspectives while still implementing the technologies. For example, "receive messages" 230 can also be described as "send messages" from a gateway client perspective.

V. Features Associated with a Messaging Gateway

1. Example Messages

In any of the examples herein, a publish-subscribe message (or simply "message") can take the form of a digital or electronic message in a publish-subscribe messaging environment. Such a message can be at any stage of its life cycle, at a publisher prior to sending, in flight to a message broker, stored at a message broker, in flight en route to a subscriber, or at a subscriber after delivery. The message can be copied (for example, to multiple subscribers), translated, buffered, processed, or otherwise operated on, during its lifecycle.

Numerous features of such publish-subscribe messages are described herein. In practice, such messages can have the message structure as described herein.

2. Example Message Structure

Figure 7:
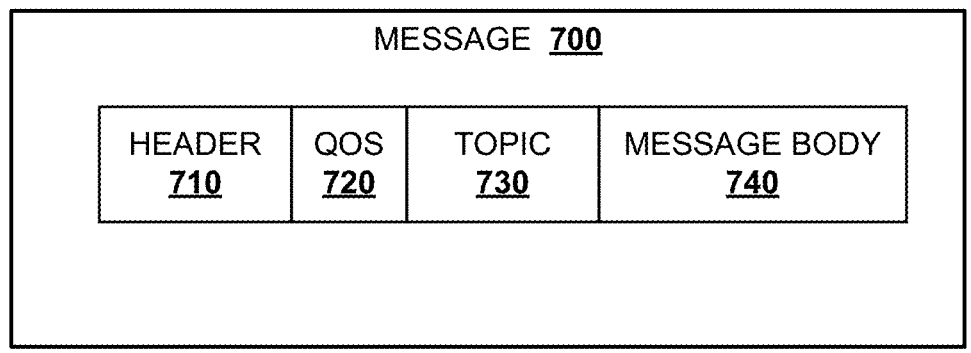
FIG. 7 is a diagram showing parts of an example message.

FIG. 7 shows an example structure of a message 700 in a publish-subscribe environment that can be used in any of the examples herein. Message 700 comprises a header 710, a QoS (Quality of Service) level 720, a topic 730, and a message body 740.

The header 710 can contain information related to network protocols, messaging protocol (for example a protocol version), an encapsulating wrapper, originating publisher, a time stamp, or other information. The QoS level 720 can specify a quality of service for the message. For example, QoS can vary between e.g. 0 for fire-and-forget, or delivery at most once, and e.g. 2 for guaranteed delivery exactly once, as described herein. Including QoS 720 within message 700 can allow the message to be handled appropriately at various stages of its life cycle. The topic identifier 730 (or simply "topic") categorizes the message, which allows the message to be delivered to appropriate brokers and subscribers. The message body 740 provides the actual content or payload that a publishing client attempts to convey to a subscriber. In practice, the technologies described herein need not modify or change the body 740 of the message, except to perhaps change an encoding or the like.

The example structure shows logical components of the message 700. In practice, the physical representation of message 700 can be varied among implementations of the disclosed technologies, and even within a single implementation. For example, the message format can change during transmission, and storage of the message and individual fields can also be changed.

Furthermore, fewer or more fields than those shown may be present. Fields can be inherent, for example in an example which only supports QoS 0, a message format can omit a field for QoS level. Fields can be absent, for example a message format can omit a header. In other examples, additional fields can be present, for example multiple topics, or a field indicating lifetime (time-to-live, or expiration). Fields can admit further structure and sub-components.

The structure of published messages sent from a client publisher to a broker can be similar to the structure of subscribed messages sent from a broker to a client subscriber. However, published messages can differ in structure or content from subscribed messages. In some examples, subscribed messages can be sent as digests of published messages on a topic, which can be digests of up to a maximum number of messages, a maximum digest size, or for a specified time period such as an hour, a day, a month, or a year. In other examples, subscribed messages have identical QoS, topic, and message fields as the published messages they reflect.

3. Example Clients

In any of the examples herein, a gateway client such as 11A-11N can be any message-publishing or message-subscribing device, such as sensors, controller, or computing nodes. In an Internet-of-Things setting, exemplary clients can be sensors or controllers of things.

However, the architecture is not limited to so-called "small" devices for clients. Just as a meta broker gateway 550A appears as a client to a broker 560A in the persisted messages layer 530 (with reference to FIG. 5), the architecture shown is capable of vertical scaling, so that for example a broker interface (which looks like a client) of another meta broker gateway can be connected in place of a gateway client such as client 11A, leading to a hierarchical organization of meta broker gateways.

4. Example Message Brokers

In any of the examples herein, a message broker (or, for brevity, simply a broker) can be an entity capable of receiving publish-subscribe messages, storing publish-subscribe messages, and transmitting publish-subscribe messages to and from multiple clients. In practice, such message brokers can take the form of computing nodes, hardware appliances, storage repositories, and the like.

In some examples, a broker can be capable or operable to perform only a subset of the receiving, storing, and transmitting functions. Message brokers can be implemented as hardware appliances or as software services such as a middleware messaging service. Along with and in place of message brokers, other appliances or services can provide similar interfaces but different functions, such as a big data archive. The term "broker appliance" can refer to any broker or appliance that can be utilized in broker layer 70, backbone broker appliance layer 80, persisted messages layer 530, or among 1021-1023, in the various Figures.

5. Example Protocols

In any of the examples herein, a protocol can take the form of a messaging protocol, such as MQTT (Message Queuing Telemetry Transport), REST (REpresentational State Transfer), MQTT over WebSocket AMQP (Advanced Message Queuing Protocol), OpenMAMA (Open Middleware Agnostic Messaging API), STOMP (Streaming Text-Oriented Messaging Protocol), any variants or derivatives, and/or other open, proprietary, or standard protocols.

6. Example Topics

In any of the examples herein, the messaging technologies can support topics. Topics can be implemented as named logical channels. Topics can be specified by a topic identifier. In practice, a hierarchy of topics, sub-topics, and the like can be supported in a topic namespace. Topics can be freely organized, according to a textual scheme, a numeric scheme, a semantic scheme, a tag-based scheme, or in other ways.

Because the technologies can support pattern matching on a topic identifier, in any of the examples herein, a topic pattern can be used in place of a topic and vice versa.

7. Example Topic Mapping

In any of the examples herein, a stored topic mapping can represent a relationship between a topic or topic pattern and one or more message brokers. In practice, a plurality of topics or topic patterns are represented by topic mapping entries in a topic mapping repository. Although it is called a "mapping," in practice, a rich set of functionality can be provided by supporting mapping entries that allow more complex rules than a simple 1:1 or 1:n mapping.

The term topic mapping can also refer to establishing a relationship during configuration of a publish-subscribe environment or a meta broker gateway, and to the use of the relationship to determine one or more message brokers associated with a particular topic or topic pattern.

Topic mapping records can be organized within a repository such as a database, a table, or other structure and is typically organized as a plurality of entries. Such a repository can be hosted in a separate software module or in a separate computing node. In some examples, the mapping repository 162 can also provide routing decisions using additional information such as message protocol, client type, client identity, and/or time of publishing. Additionally, a mapping entry can ignore the message topic completely; for example, a mapping entry can specify that messages matching any arbitrary criteria (e.g., all messages) be sent to a big-data archiving store.

In practice, a topic mapping repository can be implemented in which mapping entries, rules, and the like are stored. The topic mapping repository can be accessed by a publish-subscribe engine or topic router to determine a destination route for a published message or a subscription request. The repository can be implemented as a database, as a table, as a file, as an XML or JSON structure, as a set of rules, or in some other form. Further details and examples of topic routing rules are described below.

Routing rules can comprise a topic or topic pattern and a respective broker destination. If an incoming message has a topic that matches multiple rules, then the message is correspondingly forwarded to multiple brokers.

8. Example Persistless Message Routing

In any of the examples herein, the messaging meta broker gateway can route incoming messages without persisting them. For example, instead of storing messages in a queue or database, they can be directly passed to their destination, whether it be a client, message broker, or data repository. Such a persistless message routing approach allows the messaging meta broker gateway to scale well horizontally.

Persistless message routing can also be achieved by processing messages in memory only, without storing to secondary storage. So, incoming messages from clients can be passed to corresponding brokers without storing to secondary storage.

9. Example Quality of Service

In any of the examples herein, Quality-of-Service (QoS) can indicate a delivery expectation of a message. In some examples such as MQTT, the following three QoS levels are defined: level 0 meaning "deliver at most once" and sometimes referred to as fire-and-forget, level 1 meaning "deliver at least once", and level 2 meaning "deliver exactly once."

A QoS 0 message can be transmitted and not retained in a storage medium. Because it is not retained, it is unlikely to be retransmitted, hence will be delivered at most once. A QoS 1 message can be stored and retransmitted, for example until an acknowledgment is received. Because a retransmission could occur before the acknowledgment of a prior transmission is received, a QoS 1 message could be delivered more than once, but is expected to be delivered at least once except in unusual circumstances such as permanent network disruption, or permanent mismatch between transmitter active times and receiver active times.

A QoS 2 message can be propagated using additional handshaking between a sender and a receiver, whereby a sender can send a cancellation to a first transmission if no corresponding acknowledgment has been received, and can wait for an acknowledgment of the cancellation before making a second transmission attempt. Another QoS level can support guaranteed transmission of messages in order. In the preceding discussion, the terms sender and receiver can refer to a client publisher and a message broker respectively, or can refer to a message broker and a client subscriber respectively, or can refer to any other intermediate nodes along a transmission path of the message. Other protocols or examples can employ different QoS levels or nomenclature.

10. Example Subscription Request Structure

Figure 8:
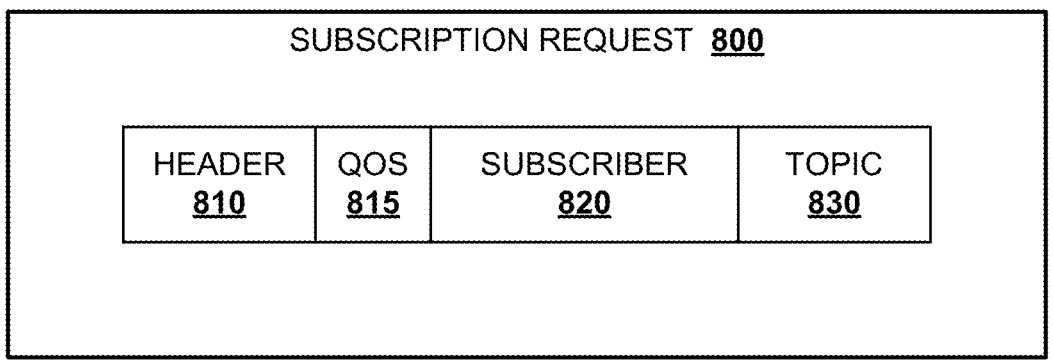
FIG. 8 is a diagram showing parts of an example subscription request.

FIG. 8 shows the structure of an example subscription request 800, comprising a header 810, a QoS level 815, a subscriber identifier 820, and a topic identifier 830 as example fields. The header 810 and QoS level 815 perform similar functions and have similar considerations as header 710 and QoS level 720 described above.

The subscriber identifier 820 can be used so that a message broker or meta-broker gateway can keep track of which clients are subscribed to a particular topic. However, the subscriber identifier 820 can be implicit. For example, a subscription request 800 received over client A's connection is understood to originate from client A; thus it is not necessary to explicitly include a field "A" within the subscription request 800. However, the same request can be processed within a meta-broker gateway where it is outside a dedicated client connection, and consequently a subscriber identifier field 820 can be introduced. Thus the physical representation of subscription request 800 can have a subscriber identifier field 820 added upon entry into a meta-broker gateway, even though the logical components have not changed.

The topic identifier 830 can be a single topic (such as "SAP"), or it can be a pattern (such as topics beginning with "S") or rule (such as "all software companies"), with variations between examples of the disclosed technologies, and variations between subscription requests 800 in a single example of the disclosed technology. Topic identifiers 830 can be transmitted intact from a subscriber to a holder of subscriptions (such as a message broker or a meta-broker gateway), or they can be adapted as the subscription request 800 is en route. For example, a message broker can decode a topic pattern or topic rule into multiple subscription requests 800 for various topics within scope of the topic identifier 830. A message broker can collect subscription requests 800 pertaining to a same topic, allowing it to remove a topic identifier 830 (leaving the topic identifier 830 as an implicit field). A meta-broker gateway can split subscription requests 800 into separate subscription requests 800 for different topics or topics maintained by different brokers.

In any of the examples herein, a meta-broker gateway can replace a client subscriber identifier 820 with its own identifier, and forward a subscription request 800 in its own name rather than in a client's name. Topic routing rules can support translation of topic fields.

11. Example Subscription Mapping

As described above, a subscription request can include a topic identifier 830 and a subscriber identifier 830. To route subscription requests to proper broker appliances, a messaging gateway can use a topic router and a topic mapping (e.g., in a repository) as described above.

To route messages on subscribed topics to proper clients, the messaging gateway can maintain a subscription mapping repository, which can contain records associating topics and/or topic patterns with subscribing clients. The subscription mapping repository can be updated as subscription requests are received, and is accessed to route messages from a broker layer to correct client destinations.

Multiple subscriptions to a particular topic or topic pattern can be said to form a cluster within subscription mapping repository. Upon receipt of a subscribed message, the messaging gateway determines from a cluster associated with a topic of the subscribed message, which clients have subscribed to the message topic, in order to forward the subscribed message to the clients as indicated. In some examples, the subscriptions can be organized according to topic in a tree or tree-like structure, in which case a cluster is a tree or sub-tree within the subscription mapping repository. However any number of other structures can be used. For example, subscriptions or associated records can be organized according to any data structure or as a flat unorganized list.

VI. Another Example Messaging Gateway Method

Figure 3:
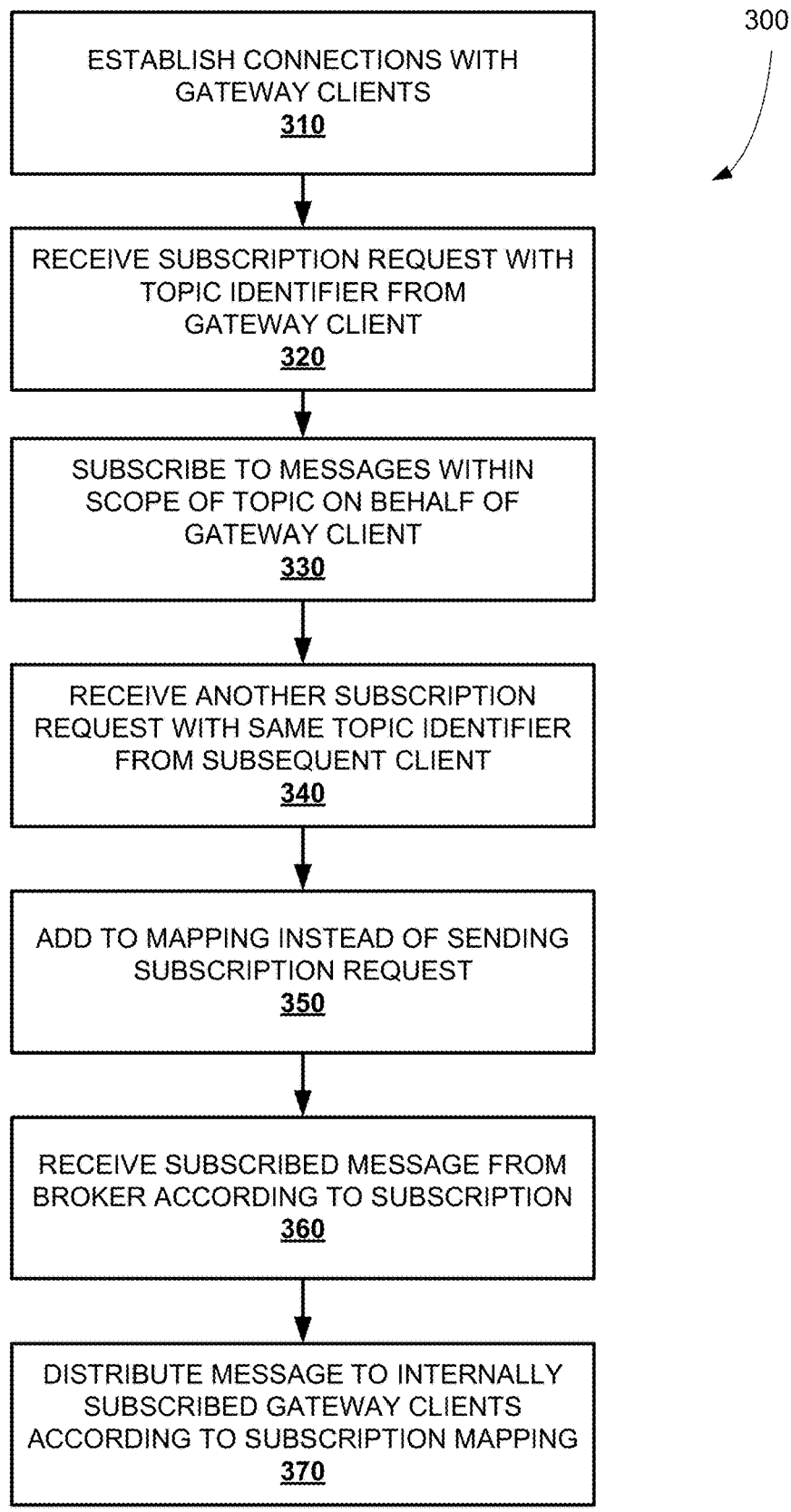
FIG. 3 is a flowchart of an example method of operation of a messaging gateway.

FIG. 3 is an example method of processing subscriptions from gateway clients and can be performed by any of the systems described herein. In practice, a meta broker gateway can perform the method of FIG. 3 in concert with other methods herein, such as FIG. 2.

At 310, a messaging meta broker gateway (e.g., 101A) receives connection requests from one or more of gateway clients such as 11A-11N, and proceeds to establish respective client connections.

At 320, the messaging gateway receives a subscription request from a requesting gateway client (e.g., 11n). As described herein, a subscription request can include a topic identifier that indicates the topic or topics that gateway client 11n requests to subscribe to. Topic patterns with wildcards can also be supported as described herein.

At 330, the messaging gateway subscribes to one or more topics within scope of the topic identifier, on behalf of gateway client. The gateway can manage subscriptions internally via the subscription mapping repository as described herein, thus serving as a proxy for subscribing gateway clients. The determination of which brokers to forward the subscription request(s) to is made using a topic mapping repository 162, similar to how message topic routing is handled.

A single incoming subscription request can result in multiple outgoing subscription requests. For example, if the topic identifier is "apple," then the messaging gateway can simply subscribe to "apple." If the topic identifier is "a*", which is a pattern with a wildcard, indicating topics beginning with "a", then the messaging gateway can separately subscribe to "apple," "asparagus," "anchovy," and other known topics beginning with "a." Alternatively, the messaging gateway can subscribe to the topic pattern "a*." A single subscription request for topic "apple" can also lead to multiple subscription requests from the messaging gateway to different brokers or appliances if multiple brokers or appliances are potential sources for (e.g. hosting) the topic "apple." In examples, one or more of the multiple subscription requests can be translated for compatibility with destination broker appliance(s).

The subscription request can be represented in (e.g., entered into or added to) a subscription mapping repository.

As more requests for a same topic are received at 340, such subscription requests can be entered in the subscription mapping repository at 350 instead of (e.g., in lieu of) sending another subscription request.

At 340, the messaging gateway receives a second subscription request from a gateway client, also for topic "apple." In this case, messaging gateway has already subscribed to "apple" (on behalf of the earlier client), and there is no need to issue another redundant subscription for "apple." Hence, the second subscription request is added to subscription mapping repository at 350, but no further subscription requests need be forwarded to any broker or appliance. Subsequent subscriptions can occur, resulting in similar processing.

Subsequent subscription requests for the same topic can form a cluster of subscriptions with the first subscription request (e.g., for the topic "apple.") While the various subscriptions for the same topic can be logically organized together, the various subscriptions for the same topic can be organized in any manner, or even disorganized, within the subscription mapping repository. Upon receipt and processing of a first subscription request for "apple," the "apple" subscription cluster contains a single subscription request. The subscription mapping repository can contain multiple, even many, clusters of subscriptions for "apple," "orange," "a*" and so forth.

At 360, the messaging gateway receives a subscribed message from a broker according to the subscription (e.g., a broker sends the message as a result of the earlier subscription request, which was accepted by the broker). The subscribed message is within scope of the subscribed topic. For purpose of illustration, the message has a topic "apple," for which the messaging gateway already has a subscription cluster.

At 370, the message is distributed to internally subscribed gateway clients according to the records in the subscription mapping repository. For example, the gateway determines from its subscription cluster for "apple" which gateway clients are subscribed to "apple," and distributes the message to the one or more gateway clients accordingly.

In practice, after the last remaining client for a particular topic cancels its subscription (or otherwise loses its subscription, such as due to termination of its connection), the meta broker gateway can cancel any subscription(s) to the brokers for the topic.

While a single meta broker gateway has been described above, examples with multiple meta broker gateway instances can perform in substantially similar ways. In some examples, each gateway instance maintains a separate subscription mapping repository 164. In some examples, each gateway instance shares, or holds substantially identical replicas of (e.g., mirrors), a common topic mapping repository 162.

VII. Example of Multiple Cooperating Messaging Meta Broker Gateway Instances

Figure 5:
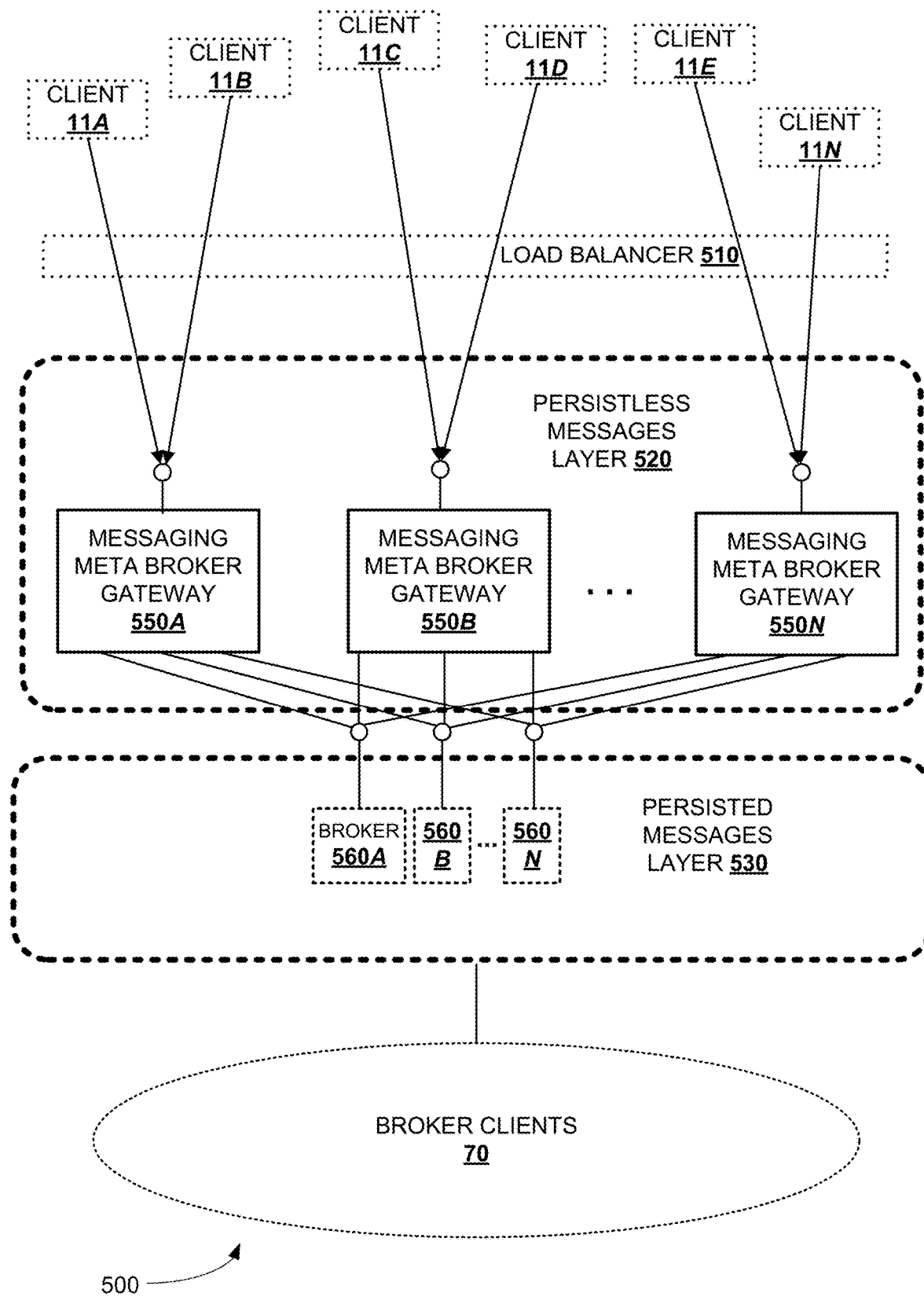
FIG. 5 is a diagram showing example connectivity of a plurality of meta broker instances in a publish-subscribe environment.

FIG. 5 is a block diagram showing example connectivity of a plurality of meta broker instances in a publish-subscribe environment 500. At a high level, FIG. 5 shows a client layer comprising clients 11A-11N with optional load balancer 510, a persistless messages layer 520 comprising disclosed meta broker instances 550A-550N, a persisted messages layer 530 comprising brokers or appliances 560A-560N, and broker clients 70, which are shown for purposes of context.

The clients 11A-11N are connected to respective meta broker instances 550A-550N. In an example connection-oriented environment 500, an initial determination of which meta broker instance a client should connect to can be made through load-balancer 510; however redirecting subsequent message traffic through the load-balancer 510 can involve synchronization, mirroring, or migration of the connection endpoint, and can be done infrequently or never. In an example connectionless environment, a load-balancer 510 can be used throughout.

Within the persistless messages layer 520, a meta broker instance 550A-550N performs functions for handling and routing published messages and subscription requests (from gateway clients 11A-11N) and handling and routing subscribed messages (to gateway clients 11A-11N) as are described above and elsewhere in this disclosure. Because the meta broker instances 550A-550N are connected to the broker appliances in the persisted messages layer 530, the persistless messages layer 520 presents a unified appearance to clients, regardless of which meta broker instances they are connected to. In examples, the meta broker instances 550A-550N does not provide persistent storage for at least some messages and are therefore called "persistless". Persistent storage can include storage for a time duration beyond the normal buffering of data required as occurs while messages are received, pass through, are processed, and are transmitted through messaging meta broker gateways including their client-side and broker-side interfaces. Thus, persistless messaging processing is that not providing persistent storage. The persistless property of meta broker instances 550A-550N allows them to be lightweight software applications, easily extensible, with minimal synchronization requirements between meta broker instances 550A-550N. As described herein, persistless message processing can route messages without storing them in secondary storage (e.g., they are stored in memory only).

The persisted messages layer 530 comprises message brokers and other appliances 560A-560N that can retain messages and provide persistent storage beyond the time duration required for receiving, processing, and/or transmitting messages. As described elsewhere, the various brokers and other appliances may have fitness for various functions required in a publish-subscribe messaging environment, but may suffer from limitations of connection capacity, protocol compatibility, scalability, and high cost.

In any of the example herein, a number of total connections from the messaging meta broker gateways to the messaging meta broker clients can exceed a connection capacity of at least one of, or any single one of, the message brokers.

Finally, the broker clients 70 can have independent connections to different one or more of the brokers 560A-560N. Thus, the architecture is open to external connections.

VIII. Another Example Messaging Gateway Method

Figure 6:
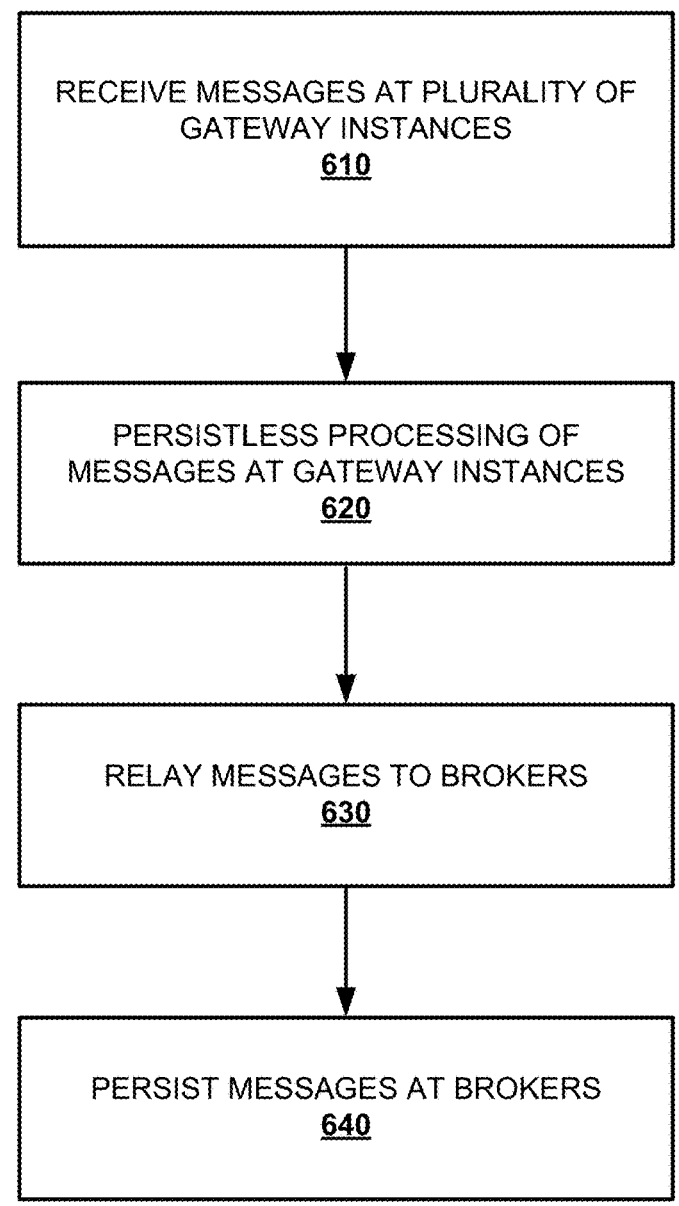
FIG. 6 is a flowchart of an example method of operation of a messaging gateway.

FIG. 6 is a flowchart 600 of an example method of operation of a messaging gateway and can be implemented in any of the examples herein.

At 610, messages are received at a plurality of gateway instances 550A-550N within persistless layer 520.

At 620, the gateway instances 550A-550N perform persistless processing on received messages.

At 630, the messages are relayed to brokers and/or appliances 560A-560N in the persisted messages layer 530.

Finally, at 640, the messages are persisted or caused to be persisted at brokers and/or appliances 560A-560N. Here, "persisted" means that the messages are stored persistently as described above.

IX. Example Messaging Environment

Figure 4:
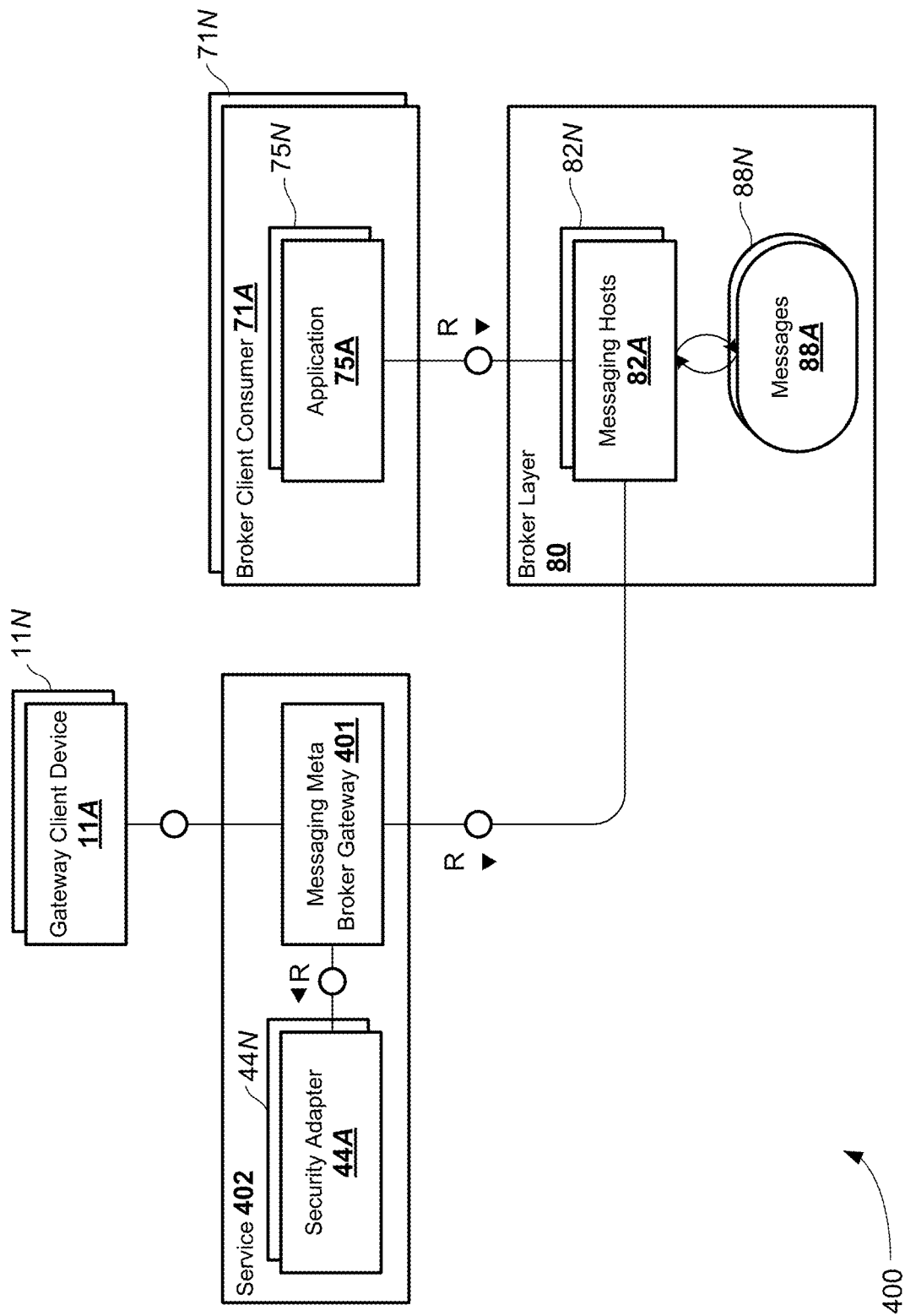
FIG. 4 is a block diagram of an example publish-subscribe environment incorporating a messaging meta broker gateway.

FIG. 4 is a block diagram of an example publish-subscribe environment incorporating a messaging meta broker gateway 401. In the example, the messaging gateway 401 is implemented as part of a service 402, which appears to client devices 11A-11N as a publish-subscribe host service, with additional security features provided by security adapters 44A-44N. Security features can include basic features such as authentication of clients and authorization to verify that a client is authorized to perform the publishing and subscription actions that it initiates. In certain examples, security adapters can also perform advanced functions, such as monitoring for irregular or suspicious activity, detecting threats such as denial-of-service attacks or spoofing, or initiating appropriate countermeasures, including locking out one or more clients or reporting threats or signatures of suspicious activity.

The broker-facing interface of the messaging gateway 401 is connected to a broker layer 80 in which messaging hosts (brokers) 82A-82N are situated. The brokers 82A-82N maintain one or more message stores 88A-88N, which can be variously organized. In some examples, a message store 88A is shared among the hosts 82A-82N, while in other examples each broker 82A-82N maintains its own store or partition. In still further examples, a message store 88A can be organized by topics, by customers, or can include dedicated client queues. Hybrid or combined organizations are also possible.

The broker layer 80 can also have connections to one or more consumers 71A-71N, each of which runs one or more applications 75A-75N. For example, in an Internet-of-Things environment, the client devices can be various sensors, and the consumers can be host applications subscribing to the sensor messages, for any of a variety of purposes including factory and process automation, financial market studies, fleet management, home and building management, premises security, homeland security, manufacturers' supervision of their own deployed devices, traffic management, or the like. Although FIG. 4 shows consumers 71A-71N, other examples use a similar topology with external producers. An external producer can push messages via broker layer 80 and publish-subscribe service 402 to associated clients 11A-11N. For example, an automobile or refrigerator manufacturer can deploy an update to its products in the field.

A consumer 71A can establish a client connection to a broker 82A by issuing a connection request to the broker 82A. Upon acceptance of the request by broker 82A and further handshakes, the broker client connection between broker 82A and consumer 71A is established. The consumer 71A can subscribe to one or more topics (for example, a topic "apple") on broker 82A by issuing one or more subscription requests to the broker 82A. Thus, when a gateway client device 11A publishes a message via messaging meta-broker gateway 401 on topic "apple", then the message is delivered to broker 82A by messaging meta-broker gateway 401, and pushed out to all subscribers. Such an arrangement can depend on consistent configuration of both the messaging meta broker gateway 401 and the broker 82A.

In examples where a broker 82B (from among brokers 82A-82N) has an external broker client publisher, operation can be similar, but in reverse. The external broker client publisher requests and establishes a client connection with broker 82B. Meanwhile a gateway client 11B can establish a client connection with messaging meta-broker gateway 401, and follow up with a subscription request on a topic "orange" which is routed by messaging meta-broker gateway 401 to broker 82B. Then, when the external broker client publishes a message on topic "orange" to broker 82B, the broker 82B delivers the message to its subscriber, messaging meta-broker gateway 401, which in turns accesses its subscription repository to deliver the message to subscribers of topic "orange," including gateway client 11B.

It is noted that on the gateway client side, the client 11C has a single connection through which brokers 82A-82C are accessed. Client C sees a unified publish-subscribe messaging service provided by messaging meta-broker gateway 401, and can be unaware of the individual brokers 82A-82C and their functions, protocols, and other properties. In contrast, on the broker client side, a device 71C can independently manage separate connections to any among brokers 82A-82C that it wishes to utilize.

Symbols like "◄R" in FIG. 4 and elsewhere indicate a direction in which a connection is initiated or in which registration of a connection occurs. For example, messaging meta broker gateway 401 can register with a security adapter 44A, and can also register a connection with messaging host 82A. Application 75A can initiate a connection or registers with messaging host 82A.

X. Example Meta Broker Operations

Figure 9:
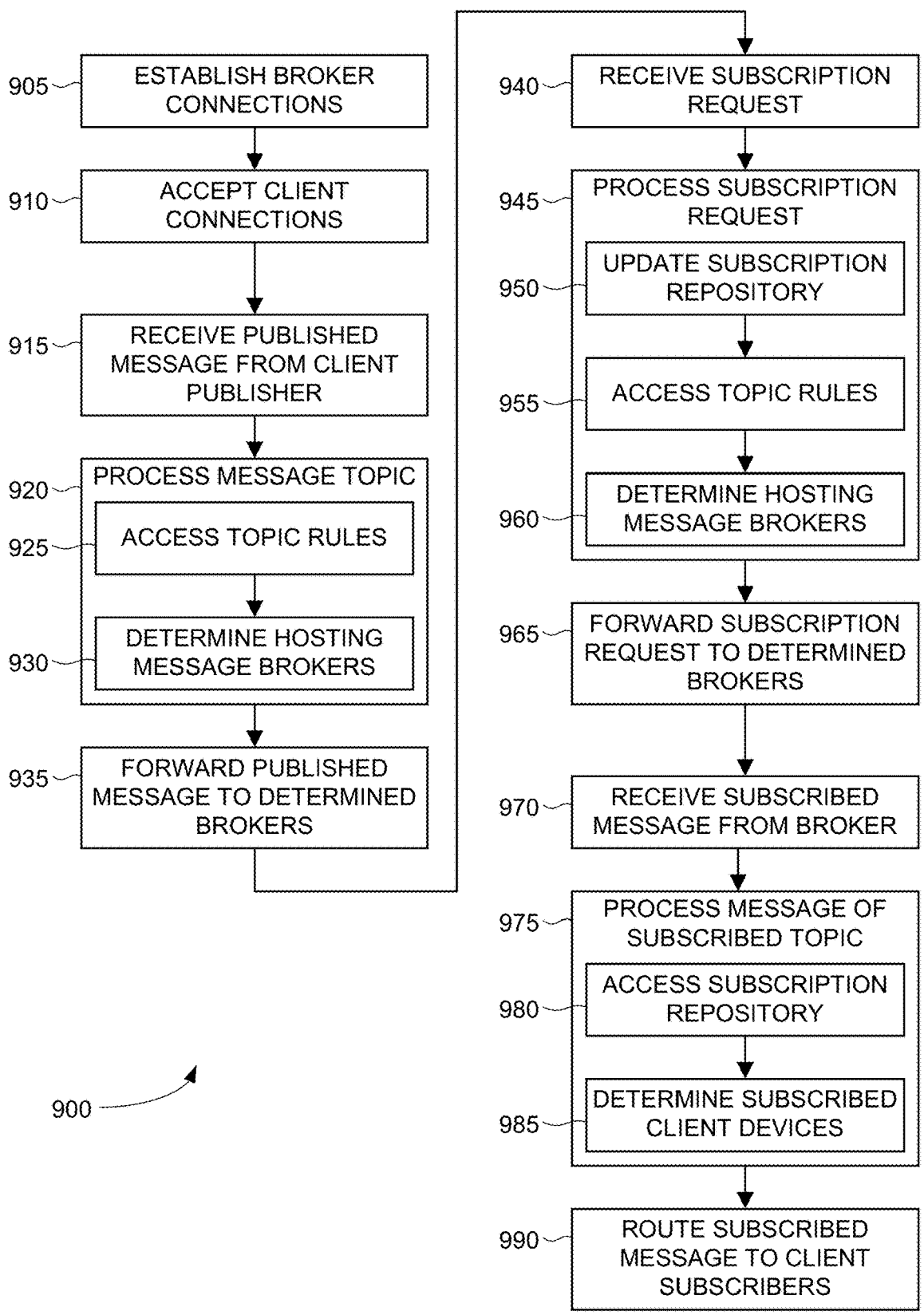
FIG. 9 is a flow chart of example operations in a meta broker.

FIG. 9 describes operations of a meta-broker, which can be considered in four phases:

1. Establishment of Connections

At process block 905, broker connections are established. In some examples, a messaging gateway such as 101A (of FIG. 1) initiates a connection by issuing a connection request to a broker such as 82. Upon acceptance of the request, further handshakes can be performed for purpose of authentication, authorization, negotiation of networking and messaging protocols, and configuration (such as a pub, pub/sub, or sub connection type) resulting in an established connection to broker 82. In other examples, different procedures can be used to establish one or more broker connections. In some examples, broker connections are static, while in other examples, broker connections can be renegotiated or reconfigured during the lifetime of the publish-subscribe environment.

At process block 910, messaging gateway 101A accepts connections from one or more of gateway clients such as 11A-11N, thereby establishing its client connections, with similar handshaking as described above. While shown as sequential steps, this is not a requirement: in different examples, client connections and broker connections can be set up in any order. Connections, and particularly client connections, can be added at different times over the lifetime of a publish-subscribe environment.

2. Forwarding a Published Message Incoming from a Gateway Client

At process block 915, messaging gateway 101A receives a published message from a gateway client such as 11A. At process block 920, the published message is processed through the layers and subsystems of messaging gateway 101A, which can involve changes to the format and content of components of the published message. Particularly, messaging gateway 101A can access its topic mapping repository 162 at process block 925, and can thereby determine which one or more brokers or appliances the published message should be routed to (process block 930). Messaging gateway 101A can forward the published message accordingly, at process block 935.

3. Topic Routing

During configuration of a meta broker gateway in a publish-subscribe environment, a set of topic routing rules can be defined as part of a topic mapping in order to route published messages and subscription requests to the right broker or broker appliances. The rules can be maintained in a repository for access by a publish-subscribe engine or topic router. The repository can be implemented as a database, as a table, as a file, as an XML or JSON structure, as a set of rules, or in some other form. In some examples, published message and subscription requests are routed regardless of topic, while in other examples the topic space is closed, and only recognized topics or topic patterns are accepted. Some broker appliances can be configured to be consistent with the meta broker gateway's topic mapping repository, while other broker appliance can accept all received messages, and still other broker appliances can learn their topics during operation, as published messages and subscription requests are received.

A topic router can access the topic mapping repository to determine a destination route for a published message or a subscription request. Further details and examples of topic routing rules are herein.

4. Handling a Subscription Request from a Gateway Client

At process block 940, messaging gateway 101A receives a subscription request from a gateway client such as 11N. At process block 945, the subscription request is processed through the layers and subsystems of messaging gateway 101A, which can involve changes to the format and content of components of the subscription request, as described above. As part of processing 945, messaging gateway 101A can update its subscription repository 164 (process block 950), so that at a later phase it is able to determine which gateway clients are subscribed to a particular topic. By accessing topic mapping repository 162 (process block 955), messaging gateway 101A can also determine which one or more brokers or appliances the subscription request should be routed to (process block 960). Then, at process block 965 corresponding subscription request(s) are issued to these brokers and/or appliances. As described above, the broker subscription can be in the name of the messaging gateway 101A, in which case broker such as 84 can receive an indication that messaging gateway 101A is subscribed to a topic or topic pattern within scope of the original subscription request of gateway client 11N. A single subscription request from gateway client 11N can lead to multiple subscriptions to one or more broker topics at process block 965, at the same broker or at different brokers.

In some examples, a gateway client can unsubscribe from a topic using a similar mechanism. In some examples, the lifetime of a gateway client's subscription is the lifetime of its connection, while in other examples, messaging gateway 101A can preserve a client's state across sessions.

5. Distributing a Subscribed Message to Gateway Client(s)

At process block 970, messaging gateway 101A receives a subscribed message from a broker such as 86. At process block 975, the subscribed message is processed through the layers and subsystems of messaging gateway 101A. Particularly, by accessing its subscription repository 164 (process block 980), messaging gateway 101A can determine which gateway clients are subscribed to the topic of the subscribed message (process block 985), and can forward the subscribed message accordingly at process block 990.

XI. A Distributed Meta Broker Example

Figure 10:
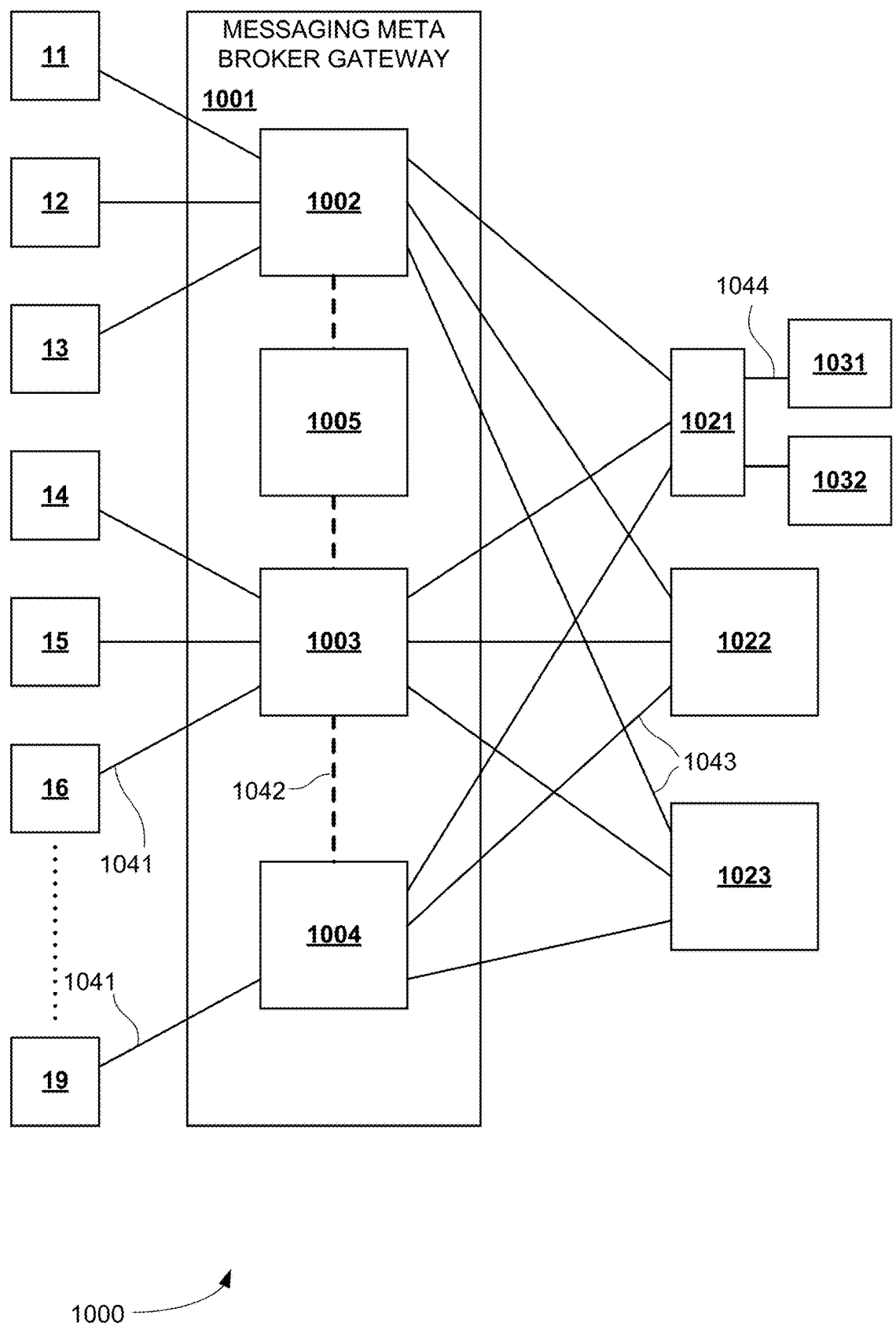
FIG. 10 is a diagram showing connectivity of an example meta broker in a publish-subscribe environment.

FIG. 10 depicts an example of a distributed meta broker gateway 1001 in a publish-subscribe environment 1000. The meta broker 1001 is distributed over meta broker instances 1002, 1003, and 1004. In some examples, meta broker instances 1002-1004 are substantially similar or even substantially identical, while in other examples meta broker instances 1002-1004 can differ in substantive ways, for example in size or capacity, in supported protocols, or in physical interfaces.

The meta broker instances 1002-1004 can be realized on any type of computer processor or hardware, as described further below, including servers, cloud computing resources, virtual machines, FPGAs, or combinations thereof. A single meta broker instance can be realized on a single real or virtual processor, or it can be distributed among multiple processor resources.

In the example, clients 11-19 are connected to one meta-broker instance each via client connections 1041. In some examples, connections 1041 and 1043 in a publish-subscribe environment are logical connections realized over physical links such as one or more networks. While in many examples, clients have a single client connection, this is not a requirement: in some examples, clients can have multiple client connections for multiple subsystems of the client, or for participation in distinct publish-subscribe environments.

In an Internet-of-Things environment a client can be a sensor or a controller of a Thing.

In some examples, the meta broker 1000 can also include one or more computing nodes, resources, or processors 1005 that are not meta broker instances. For example, a node 1005 can be an administrative host for configuration, monitoring, human interface, or other functions. The node 1005 can also host a common topic mapping repository that is shared by meta broker instances 1002-1004. The node 1005 can also be a standby node, kept ready for failover of one of the live meta broker instances 1002-1004, or for expansion of meta broker 1001.

Internal connections 1042 among the meta broker instances 1002-1004 and with other nodes 1005 can be provided by network resources including wired, wireless, optical or virtualized networking resources. Internal connections 1042 allow administrative access to each of the meta broker instances 1002-1004, to other nodes 1005, and also permit meta broker instances 1002-1004 to communicate among themselves, for example to share broker-side configuration requirements, to share warnings, errors, and security threat indications, or in support of load balancing.

At the broker side, meta broker 1001 is connected to broker appliances 1021-1023 via broker connections 1043. In the example shown, each meta broker instance 1002-1004 is connected to the same set of broker appliances 1021-1023, however this is not a requirement of the disclosed innovations: depending on the organization of clients between meta broker instances 1002-1004, in some examples it can be known a priori that meta broker instance 1002 does not have any clients needing a connection to broker appliance 1022, in which case a broker connection 1043 between meta broker instance 1002 and broker appliance 1022 can be omitted.

FIG. 10 also shows external connections 1044 from broker appliance 1021 to entities 1031-1032. In some examples, one or more of entities 1031-1032 can be a big data repository, an external client, an administrative host, a security appliance, or another meta-broker gateway. In other examples, instead of being a broker appliance, there can be another meta-broker gateway 1021, with connections to any of client devices, broker appliances, meta-broker gateways, security appliances, or administrative hosts or other entities represented by entities 1031-1032.

The distribution of work or client connections between meta broker instances 1002-1004 can be organized in different ways. In some examples, connections 1041 can be set up based on arrival order of clients into the publish-subscribe environment 1000. In such a case, meta broker 1001 can commence operation with a single meta broker instance 1002. Then, when a connection capacity threshold is reached for meta broker instance 1002, another meta broker instance 1003 can be added, with subsequent connections being made to meta broker instance 1002, and similarly when meta broker instance 1003 is added later. In other examples, clients can be connected to meta broker instances 1002-1004 based on geographic location, meaning that the meta broker instances 1002-1004 provide geographically diverse access points for the publish-subscribe environment 1000. In further examples, clients can be added round-robin in order of arrival, so as to maintain load balancing among meta broker instances 1002-1004. In still further examples, clients can be added based on messaging protocol, based on customer, based on sensor type or publishing topics, based on QoS requirements or security requirements, or on some other basis. In other examples, two or more of these techniques can be combined, such as round-robin load balancing within each of several geographically distinct zones.

The coexistence of multiple customers within publish-subscribe environment 1000 can be implemented in different ways according to customer requirements. A single meta-broker 1001 can be organized with partitioning of resources at one or more subsystems or layers to provide for logically disconnected facilities for multiple customers. In some examples, one physical example meta-broker 1001 can support multiple virtual meta-brokers 1001*a-n* (not shown) within the same computer implementation, so that different customers can obtain their own private virtual meta-brokers. In such a case, one customer's traffic for topic "T" can be completely oblivious to another customer's traffic for the same topic string. Of course, in other examples, one or more customers can coexist and share logical resources and even share messages and topics.

In FIG. 10, as elsewhere in this disclosure, the numbers of entities depicted are chosen purely for the sake of illustration. All entities shown in plural can be instantiated a greater or lesser number of times within the scope of disclosed technologies, including once, twice, more, or a very large number of times. For example, a meta-broker instance 1002 can have from zero to hundreds, thousands, or millions of client connections. Meta-broker 1001 can have billions or even approaching a trillion connections. The number of meta-broker instances 1002-1004 within meta-broker 1001 can vary from one, two, to hundreds, thousands, or even millions. Likewise the number of broker appliances 1021-1023 can vary from one, two, to hundreds, thousands, or even millions, and can be pub/sub brokers, pub brokers, sub brokers, or data appliances in any combination. Likewise, the extensibility illustrated by entities 1021, 1031-1032 can extend to a large scale, encompassing a wide range of entity types as noted above.

1. Stateless Vs Stateful Protocols

MQTT is a stateful communication protocol which can be supported over distributed instances in different ways. First, a connection can be tied to a specific meta broker instance, which retains session information. In this scenario, load-balancing, such as using HANA cloud platform framework, can be used at the time of establishing a client connection, but cannot be used for subsequent messaging. Second, session information can be synchronized between multiple meta broker instances, any of which can then receive messages from a client through a load-balancing network. Thus, for MQTT and other stateful communication examples, load-balancing of messages comes at a cost of synchronization between meta broker instances, which has impacts on scalability. Different techniques are available for maintaining synchronization, including using a database, or using a message broker.

In other examples, publish-subscribe messaging can be implemented using a stateless messaging protocol. In such examples, clients can publish messages through any meta broker instance, and client messages towards brokers can be managed through an external load-balancing network. For subscribed messages, the meta-broker instance holding a client's subscription request will forward a subscribed message to the subscribing client.

XII. Example Extensibility of Meta Broker

Figure 11:
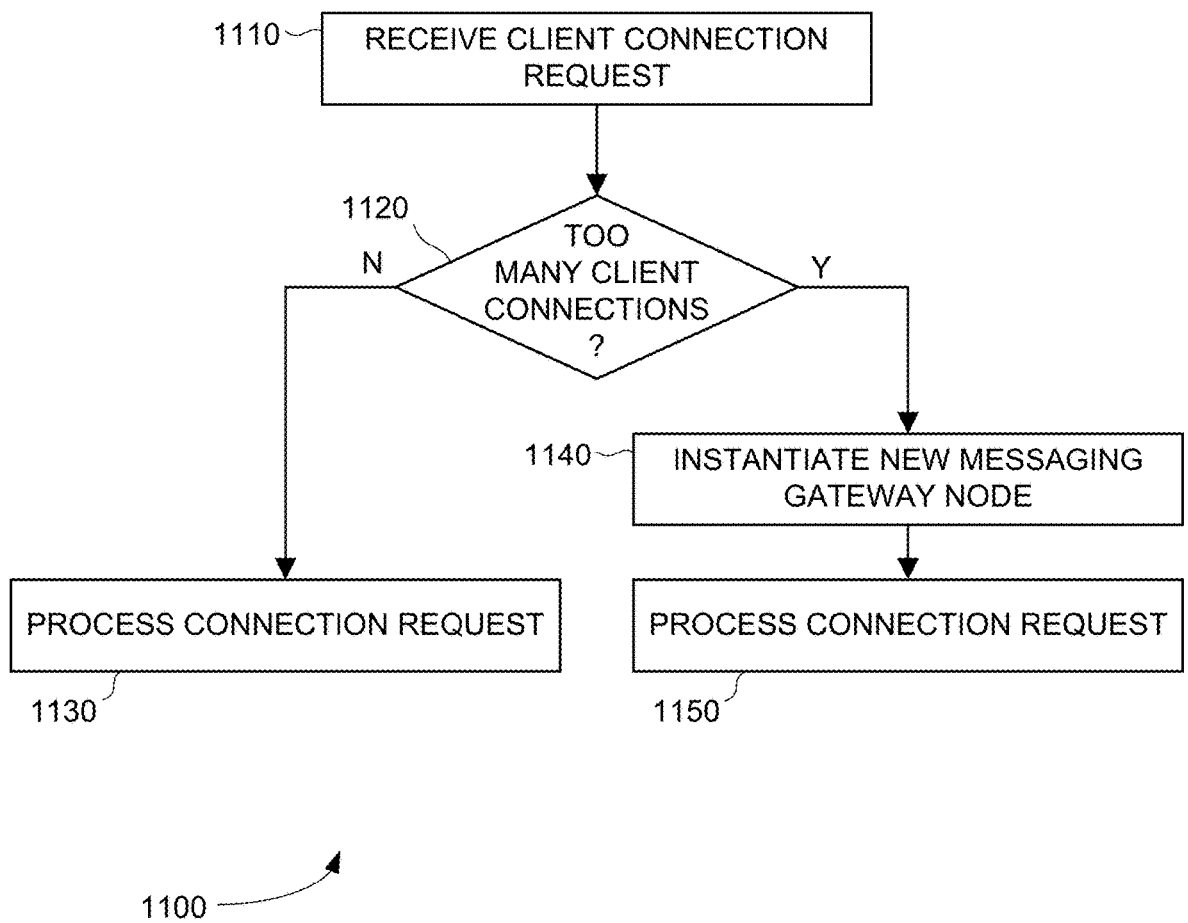
FIG. 11 is a flowchart of an example method for scaling a meta broker.

FIG. 11 is a flowchart 1100 of a method for extending or scaling a meta broker 1001. At process block 1110, a meta broker instance 1002 receives a client connection request. A monitor or administration module within meta broker 1001 makes a determination at process block 1120 whether a connection capacity threshold for meta broker 1002 will be exceeded by adding the requested connection. If not, the method proceeds to process block 1130 and processes the connection request, which can be accepted, or denied for a variety of reasons based on the particular circumstances. Some reasons for denying a client connection can include: failure to authenticate, lack of authorization for the requested connection, or presence of the requesting client on a blacklist.

If, at process block 1120, the determination is that there are too many client connections, either in total, or of a particular connection type, or for the particular meta broker instance 1002 receiving the connection request, then the method proceeds to process block 1140, where a new meta broker instance is added to meta broker 1001, thereby scaling the meta broker 1001 and expanding its capacity. Then the connection request is handled at process block 1150, in one or more of several different ways. In some examples, the capacity threshold is not a hard threshold, and the connection request can be accepted and fulfilled at meta broker instance 1002. In other examples, the individual connection request can be redirected to the new meta broker instance through a protocol mechanism or an external means. In further examples, spawning of a new meta broker instance at process block 1140 can trigger a load rebalancing process, alleviating the connection load at meta broker instance 1002 and possibly at other meta broker instances as well. Load rebalancing can be performed through migration of gateway client connections and entries in subscription mapping repositories from one meta broker instance to another. In varying examples, load balancing is performed periodically, upon spawning a new meta-broker instance, infrequently, or never. In other examples, clients connections can be terminated for a variety of reasons including deactivation, reconfiguration, or migration of a client device, and load balancing happens through attrition of client connections from heavily loaded meta broker instances and preferential direction of new client connections to underloaded meta broker instances.

Referring to FIG. 10, the path from a particular gateway client 15 to broker 82 passes through a single messaging meta-broker gateway instance. Thus, the other messaging meta-broker gateway instance can remain unaware of the existence of client 15, its published messages, or its subscriptions. In some examples, the amount of direct communication between messaging meta-broker gateway instances is minimal, there being some overhead at the time of setting up a gateway client connection. In some examples, the topic mapping repository is updated infrequently. In some examples, meta-broker gateway instances do not retain messages beyond their normal transit between connected gateway clients and connected broker appliance devices. These factors enable meta-broker gateway instances to have a very light footprint relative to the volume of traffic and connections they support, and facilitate inexpensive scaling of a messaging meta-broker gateway to very large size, with easy and fast deployment of additional messaging meta-broker gateway instances (as shown at process block 1140) as the need arises. For example, if each broker in a publish-subscribe messaging environment can support $10^5$ connections, then up to $10^5$ different meta-broker gateway instances can be connected using these broker connections. If each of the meta-broker gateway instances supports $10^5$ gateway clients, then the total number of clients connected to a single broker can reach $10^{10}$. With larger capacity brokers and larger capacity meta-broker gateway instances, connectivity to $10^{12}$ gateway clients is feasible, which is of particular interest for Internet-of-Things environments.

XIII. A Second Meta Broker Example

Figure 12:
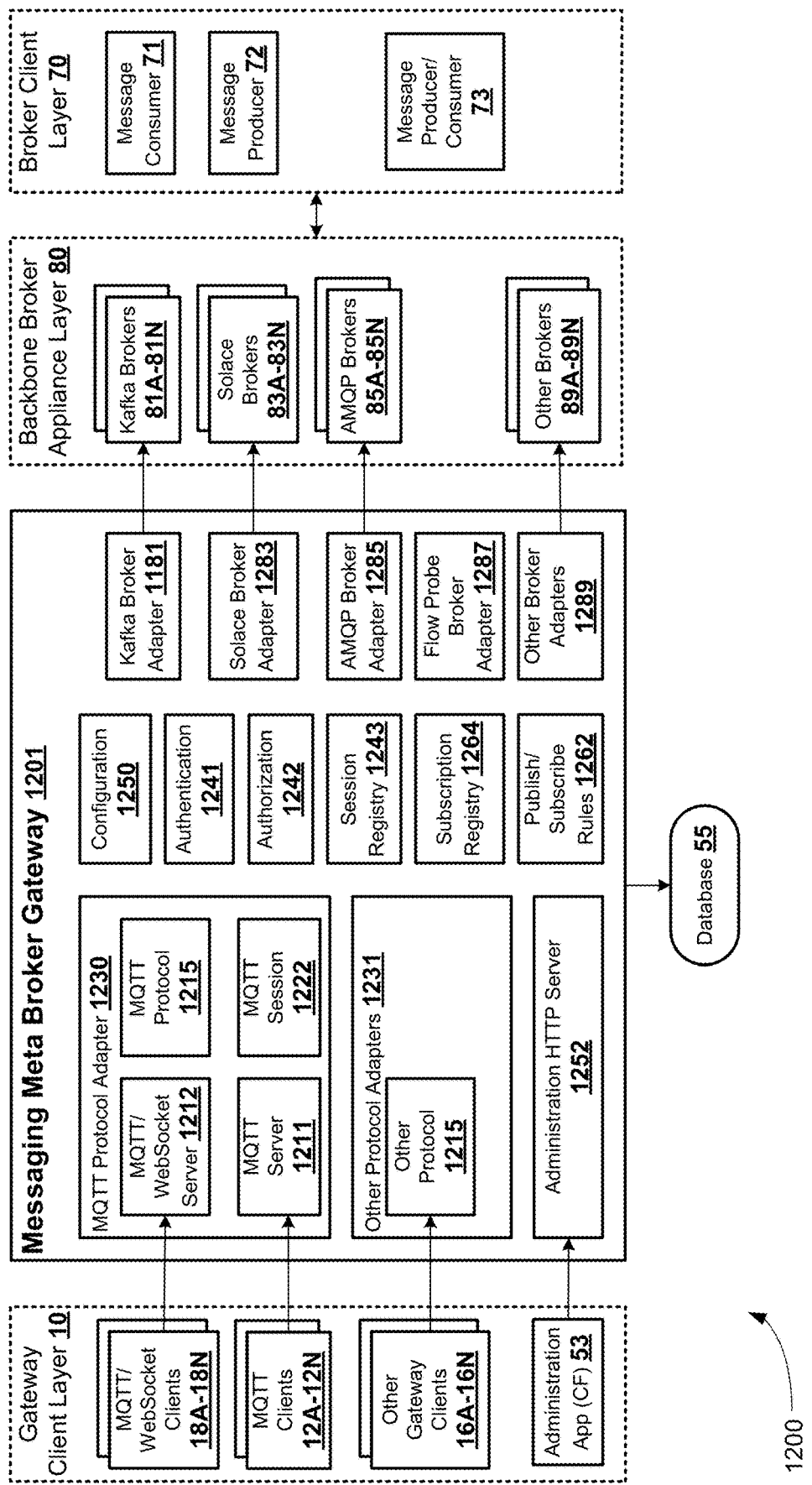
FIG. 12 is a block diagram of an example messaging gateway in a publish-subscribe messaging environment.

FIG. 12 is a block diagram of an example messaging gateway 1201 in a publish-subscribe messaging environment 1200. MQTT protocol adapter 1230 supports MQTT clients 12A-12N through MQTT server 1211 and supports MQTT-over-WebSocket clients 18A-18N through MQTT-over-WebSocket server 1212. MQTT protocol adapter 1230 also incorporates an MQTT session manager 1222 and an MQTT protocol module 1215. Messaging gateway 1201 also supports other protocols through protocol adapter 1231 and server 1215, for clients 16A-16N.

On the broker side, messaging gateway 1201 provides a Kafka broker adapter 1281, a Solace broker adapter 1283, and an AMQP broker adapter 1285 to interface with Kafka brokers 81A-81N, Solace brokers 83A-83N, and AMQP brokers 85A-85N respectively. Messaging gateway 1201 also includes other broker adapters 1289 to support other brokers 89A-89N. The brokers shown are located on a backbone 80, and support other external connections to a broker client layer 70 comprising one or more of a message consumer 71, a message producer 72, or a message producer+consumer 73.

Within messaging gateway 1201 are one or more of each of a configuration module 1250, an authentication module 1241, an authorization module 1242, a session registry 1243, and an administration server 1252 with an HTTP interface, that can be accessed from an external administration application 53. Messaging gateway also contains a subscription registry manager 1264 and a publish-subscribe rules (topic routing) manager 1262, one or both of which can have associated databases resident within the messaging gateway 1201, or in an external database 55.

XIV. Implementation of Example Operations

1. Establishing a Client Connection

Figure 13:
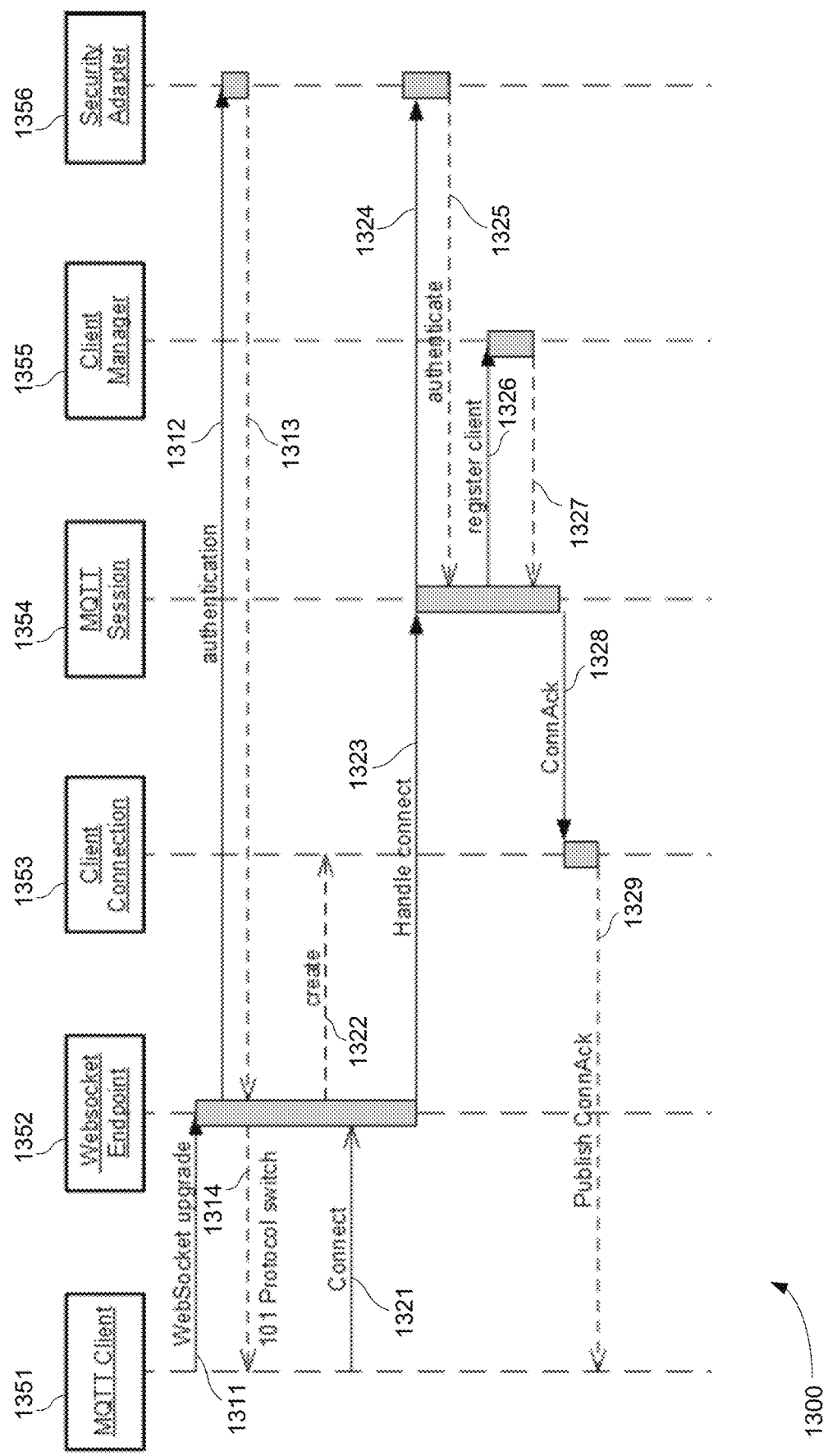
FIG. 13 is an example sequence diagram for establishing a client connection.

FIG. 13 is a sequence diagram depicting an initial connect communication from an MQTT client 1351. At 1311, client 1351 is upgraded to MQTT over WebSocket and notifies WebSocket 1352, which acknowledges the protocol switch at 1314. An optional authentication procedure is possible at this stage, shown by arrows 1312-1313.

The protocol switch is an optional feature; in many examples, the initial connect communication will begin with a connect request at 1321, which causes a client connection to be created and maintained by client connection registrar 1353, as indicated by arrow 1322. The connection signal is forwarded to MQTT session handler 1354, as indicated by arrow 1323. Another optional authentication procedure can be performed here, shown by arrows 1324-1325, with authentication performed by security adapter 1356. With the session initiated, the client is registered at client manager 1355, as shown by arrows 1326-1327. Finally, acknowledgements are sent back to the client connection registrar 1353 and the originating client 1351, as shown by arrows 1328-1329 respectively.

2. Receiving a Published Message

Figure 14:
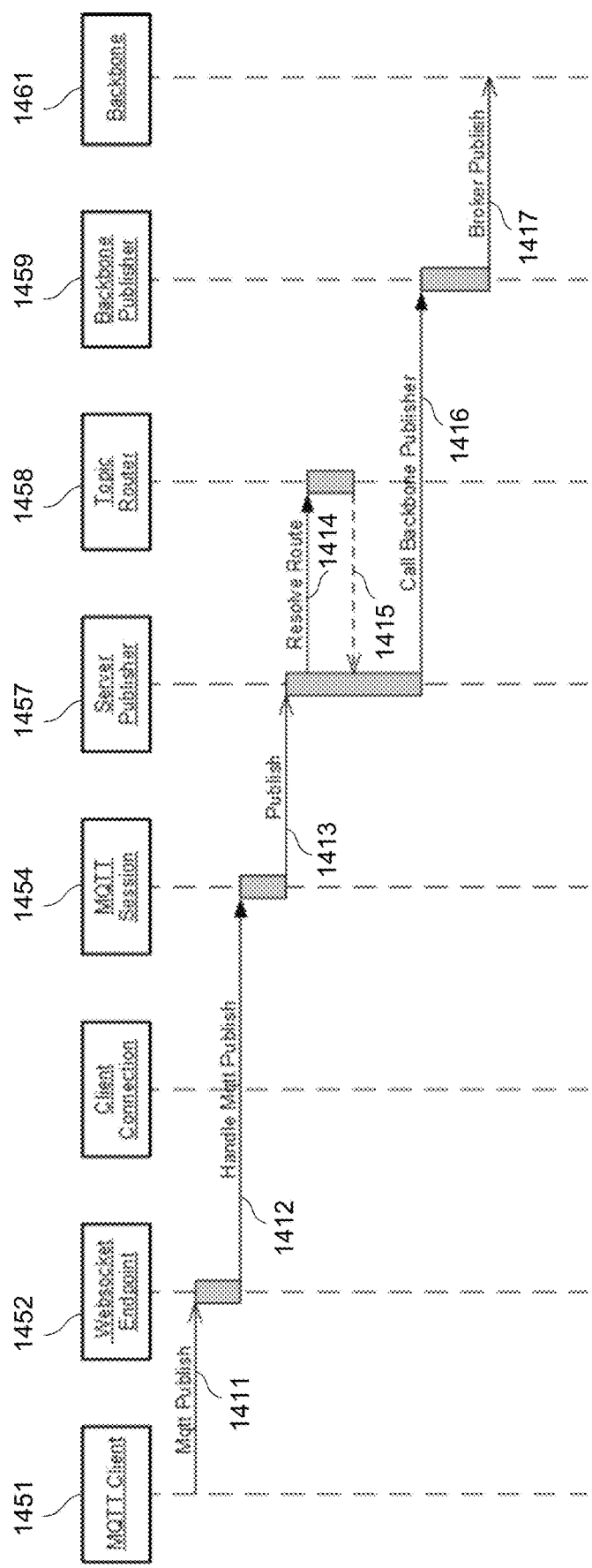
FIG. 14 is an example sequence diagram for receiving and forwarding a published message.

FIG. 14 is a sequence diagram for receiving and forwarding a published message, demonstrating a fan-in feature of a meta broker gateway. At arrow 1411, MQTT client 1451 sends an MQTT publish packet (a message) through an established MQTT-over-WebSocket connection to the WebSocket endpoint 1452. After decoding and validation of the MQTT publish packet by the WebSocket endpoint 1452, the published message is forwarded to the MQTT session handler at arrow 1412, which calls the Server Publisher 1457 at arrow 1413. Topic router 1458 is accessed at arrows 1414-1415 to evaluate the topic information of the published message. With the message routing determined, Server Publisher 1457 calls the appropriate Backbone Publisher 1459 at arrow 1416. Backbone Publisher 1458 handles the communication with the determined message broker for the message topic and proceeds to publish the message to this message broker (which resides on backbone 1461) at arrow 1417.

Fan-in is achieved through many different clients, having respective client connections, all being able to funnel their requests through a single broker connection between the determined message broker and its corresponding backbone publisher 1459.

3. Receiving a Subscription Message

Figure 15:
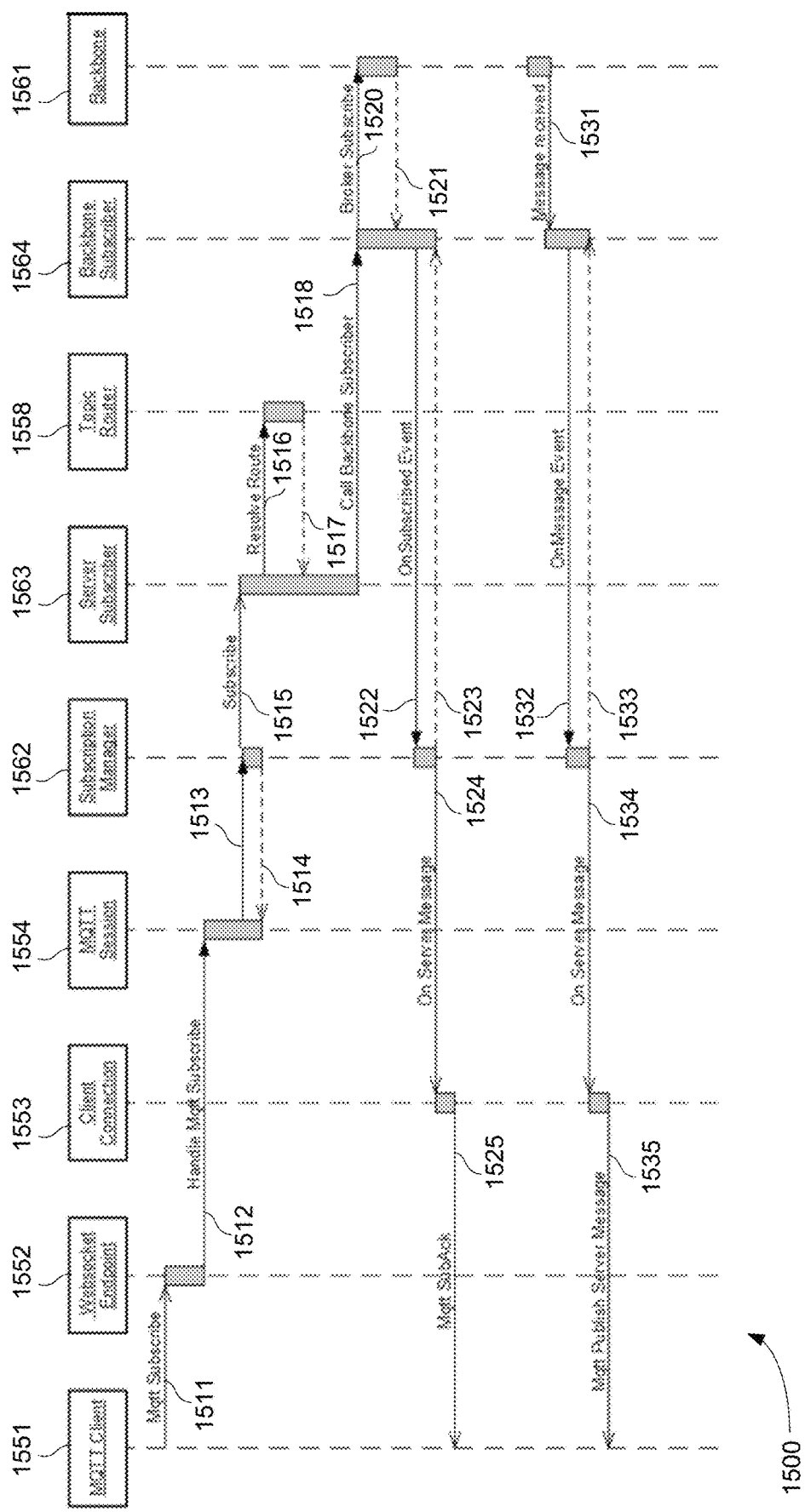
FIG. 15 is an example sequence diagram for receiving and forwarding a subscription request and for receiving and forwarding a subscribed message.

FIG. 15 is a sequence diagram for receiving and forwarding a subscription request and for receiving and forwarding a subscribed message, including a fan-out feature.

At 1511, MQTT client 1551 sends an MQTT Subscribe packet (subscription request) through an established WebSocket connection to WebSocket endpoint 1552. After decoding and validation of the MQTT Subscribe packet by the WebSocket endpoint 1552, the subscription request is forwarded at 1512 to the MQTT session handler 1554, which calls the Subscription Manager 1562 at arrows 1513-1514. Subscription Manager 1562 registers the subscription and forwards the call at 1515 to Server Subscriber 1563. Server Subscriber accesses Topic Router 1558 at arrows 1516-1517 to evaluate the topic information and determine routing for the subscription request. Server Subscriber 1563 uses the routing information to forward a subscription request at 1518 to the right Backbone Subscriber 1564. Backbone Subscriber 1564 registers callbacks and handles the communication with the message broker that is configured to handle the topic information. (This message broker is on the backbone 1561.) The forwarded subscription request is conveyed to this message broker at 1520 and acknowledged by the message broker at 1521, following which a notification is provided to the Subscription Manager at arrows 1522-1523 in order to finalize subscription registration in a subscription database. Finally, acknowledgments are sent back to the MQTT client 1551 via the client connection handler 1553 at arrows 1524-1525.

4. Transmitting a Subscribed Message

Subsequent to registration of a subscription request, a subscribed message is received at 1531 by Backbone Subscriber 1564 from its message broker in backbone 1561. A notification is provided along with the message to the Subscription Manager at 1532-1533, which evaluates the received topic and forwards the subscribed message, through the client connection handler 1553, to the subscribed MQTT clients 1551 at arrows 1534-1535.

XV. Additional Examples

Figure 16:
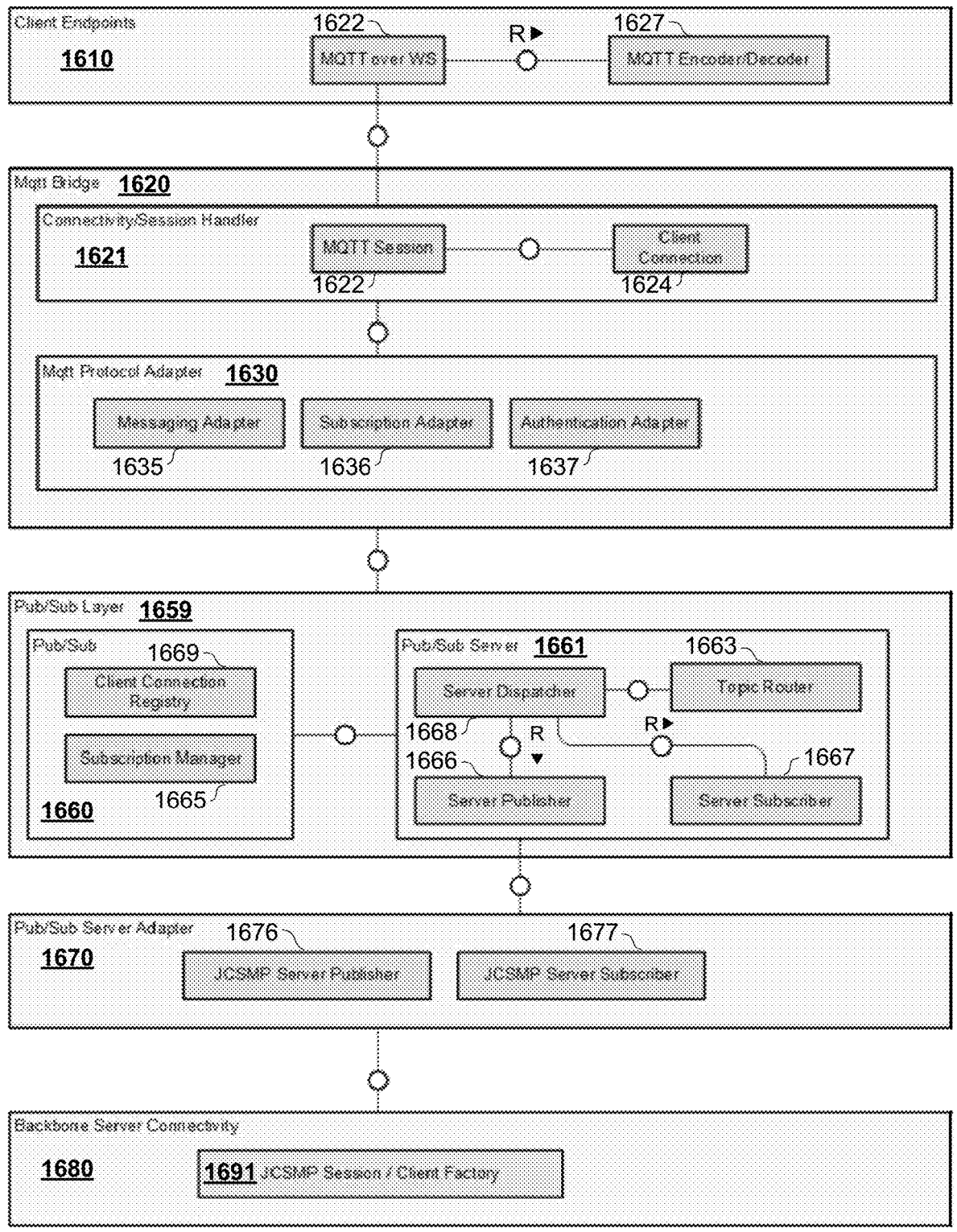
FIG. 16 is an example block diagram of an example meta broker connected to a backbone.

FIG. 16 is a block diagram of an example meta broker 1600, containing the following subsystems.

1. Client Endpoint Subsystem

Client endpoint subsystem 1610 provides connectivity endpoints for communication with different clients according to the supported communication protocols. MQTT-over-WebSocket endpoint 1623 works in conjunction with an MQTT encoder/decoder 1625. Other protocols can be supported including native MQTT and REST.

2. Client Protocol Adapter

The Client endpoint subsystem 1610 interfaces to MQTT Bridge 1620 containing connectivity and session handler subsystem 1621 and MQTT protocol adapter subsystem 1630. The Client protocol adapter subsystem 1630 handles communication protocol(s), protocol translation or transformation (enabling backbone messaging capabilities), and system adapters including messaging adapter 1635, subscription adapter 1636, and authentication adapter 1637.

3. Connection/Session Handler

Connectivity and session handler subsystem 1621 provides internal handling for connectivity and session state as required. This subsystem includes components for MQTT session management 1622 and client connection management 1624, and can also include one or more security adapters (not shown) or other modules.

4. Pub/Sub

The Pub/Sub Layer 1659 is a core component for messaging capabilities and provides the connecting link between client protocols and backbone adapters. Within the Pub/Sub layer 1659 are a Pub/Sub subsystem 1660 and a Pub/Sub server 1661.

Within the Pub/Sub subsystem 1660, the client connection registry manager 1669 manages connected clients and their sessions. The subscriber manager 1665 keeps track of client subscriptions in order to be able to route subscribed messages to their subscriber client destinations.

Within the Pub/Sub server 1661, topic router 1663 is configured to evaluate topics in order to forward the messages and subscription requests to the right backbone broker appliance. Server publisher 1666 provides an interface for publishing messages to the backbone appliances and can multiplex between backbone appliances. Server subscriber 1667 provides an interface for handling subscription requests to backbone appliances and can also multiplex between backbone appliances.

Server Subscriber/Publisher Dispatcher 1668 is a specialized server which registers one or more topic routers with Server publisher 1666 and Server subscriber 1667. Dispatcher 1668 iterates through a list of registered Server Subscribers/Publishers and calls the corresponding topic router which evaluates the topic of a particular published message or subscription request, and decides whether that Server Subscriber/Publisher should be called. In this way, a mapping or transformation of a topic to a corresponding backbone device can be obtained, including, for example, wildcard mapping for Solace brokers.

5. Backbone Protocol Adapter

The Pub/Sub Server Adapter subsystem 1670 provides protocol translation for backbone compatibility. JCSMP Server Subscriber Adapter 1676 sends subscription requests containing (topic, QoS, byte message) to a JMS messaging backbone appliance in its own protocol. JCSMP Server Publisher Adapter 1677 republishes messages containing (topic, QoS, byte message) to a JMS messaging backbone appliance in its own protocol, with the original topic. Other server publisher adapters and server subscriber adapters can be implemented within the Pub/Sub Server Adapter subsystem 1670 to support other APIs or protocols such as JMS or AMQP. JCSMP is a Solace messaging application programming interface for Java.

Server Publisher Adapter and Server Subscriber Adapter components can include some or all of three type of interface implementations. Asynchronous (async) implementation components can use a ThreadPoolExecutor in order to decouple requests processing from a main communication thread. Further, messages received from a backend server can also be decoupled from a server communication thread through an async implementation. Dispatcher components can dispatch requests by mapping server topic routes to particular server component implementation(s). JCSMP async components can implement Server Publisher/Subscriber based on JCSMP API (a Solace messaging application programming interface for Java).

6. Backbone Connectivity

The Messaging Gateway 1600 is designed to support multiple backbones. At backbone server connectivity layer 1680, a JCSMP session/client factory 1691 is operable to create sessions with broker appliances and clients on the backbone.

7. Pluggability

The Messaging Gateway 1600 can also support pluggable modules such as security adapters, which can be REST-based, and message processors, which can also be REST-based. Such pluggable modules can be registered to the Messaging Gateway 1600 or to one of its subsystems, and are called during message processing before publishing messages to a backbone broker appliance.

XVI. Example Features of Topics and Topic Routing

1. Topics

The structure of topics in a publish-subscribe environment can be freely defined, by a customer or by an operator of the publish-subscribe environment. Configuration of a messaging meta-broker gateway and other broker appliances in a publish-subscribe environment can be consistent with each other and with a defined topic structure, so that published messages on any defined topic are properly routed and received by a designated host broker appliance, and so that subscription requests are routed to the same host broker appliance.

2. Topic Routing Rules

Topic rules can have various properties, which can be applicable to published topics (pubTopicMappings, below), subscribed topics (subTopicMappings, below) or both. These properties can include:

Name of a destination broker appliance.

Protocol for delivery to the destination broker appliance.

Qualifier is a qualifier of the Server Subscriber and Server Publisher Adapters.

SourceTopicName: a topic for which the rule is applicable.

SourceTopicPattern: a regular expression (regexp) for matching a range of topics to the present rule.

TargetTopic: allows changing the topic of a message before forwarding to a broker appliance.

TargetDestination: allows messages to be directed to a specific queue or other destination at the target broker.

WildcardMappings: allow mapping wildcards in subscriptions to the target broker. For example, Solace and MQTT have different wildcards; the WildcardMappings property enables interoperability.

Further, topic routing can be implemented supporting the following modes of operation and/or features:

Client publisher: message routing to broker appliances in a backbone layer.

Client subscription: subscription routing to broker appliances in a backbone layer.

Client subscriber: message routing to gateway client appliances.

Topic transformations: messages and subscription requests can be forwarded with original topic, or with translated topics.

Topic pattern transformations: subscription requests can also have topic patterns translated to topics, or vice versa.

Queues: Within broker appliances or also within a meta broker, dedicated queues can be maintained based on client devices, topics, or customers. Topics can be routed to these queues.

3. Topic Mapping Configuration Example

Table 1 shows a sample configuration block for a routing rule for a broker.

TABLE 1

Sample Routing Rule

```
[
    {
        "brokerName":"JCSMPBroker",
        "protocol":"JCSMP",
        "qualifier":"JCSMP",
        "pubTopicMappings":[
            {
                "sourceTopicPattern":".*"
            }
        ],
        "subTopicMappings":[
            {
                "sourceTopicPattern":".*"
            }
        ],
        "wildcardMappings":[
            {
                "sourceProtocol":"MQTT",
                "targetProtocol":"JCSMP",
                "sourceChar":"+",
                "targetChar":"*"
            },
            {
                "sourceProtocol":"MQTT",
                "targetProtocol":"JCSMP",
                "sourceChar":"#",
                "targetChar":">"
            }
        ]
    }
]
```

4. Topic Mapping Configuration Example

Table 2 shows another sample of a configuration block, for topic mappings.

TABLE 2

Sample Topic Mapping Configuration

```
[
    {
        "SourceTopicName": "probe",
        "TargetTopicName": "dummy",
        "TargetBrokerAdapterName": "FlowProbe"
    },
    {
        "SourceTopicName": "kafka",
        "TargetTopicName": "test",
        "TargetBrokerAdapterName": "Kafka"
    },
    {
        "SourceTopicPattern": "kafka_(.*)",
        "TargetTopicTemplate": "${1}",
        "TargetKeyTemplate": "${clientid}",
        "TargetBrokerAdapterName": "Kafka"
    },
```

TABLE 2-continued

Sample Topic Mapping Configuration

```
    {
        "SourceTopicName": "solace",
        "TargetTopicName": "test",
        "TargetBrokerAdapterName": "Solace"
    },
    {
        "SourceTopicPattern": "solace_(.*)",
        "TargetTopicTemplate": "${1}",
        "TargetBrokerAdapterName": "Solace"
    },
    {
        "SourceTopicName": "rabbit",
        "TargetTopicName": "test",
        "TargetKey": "",
        "TargetBrokerAdapterName": "Rabbit"
    },
    {
        "SourceTopicPattern": "rabbit_(.*)",
        "TargetTopicTemplate": "${clientid}~${1}",
        "TargetKey": "xyz_test",
        "TargetBrokerAdapterName": "Rabbit"
    }
]
```

SourceTopicName is an MQTT topic name without wildcards. SourceTopicPattern is regular expression that is matched against a MQTT topic name; it can contain groups that can be referred to in a target topic template (either SourceTopicName or SourceTopicPattern can appear in a mapping). TargetTopicName is a topic name that is used to publish a matching message to the target broker and should appear together with SourceTopicName. TargetTopicTemplate is a template for a topic name, it can contain placeholders for matched groups of SourceTopicPattern ({1}, {2}, . . . ); it can be applied and used to publish a matching message to the target broker and should appear together with SourceTopicPattern (either TargetTopicName or TargetTopicTemplate can appear in a mapping). TargetBrokerAdapterName is the name of the broker adapter to which a matching message is published to. Configuration of broker adapters has been described above. Optional parameter TargetKey is used with Kafka broker adapters and should appear with SourceTopicName. Optional parameter TargetKeyTemplate is used with Kafka broker adapters and can contain the same placeholders as TargetTopicTemplate. TargetKeyTemplate should also appear with SourceTopicPattern.

In TargetTopicName, TargetTopicTemplate, TargetKey, and TargetKeyTemplate there can be additional placeholders for the publishing MQTT client ID. In particular, ({clientid}) and user ({user}) are supported.

5. Topic Mapping Configuration Example

Table 3 shows another sample of a configuration block, for mapping topic patterns to broker adapters.

TABLE 3

Sample Topic Mapping Configuration

```
[
    {
        "TopicName": "$SYS/statistics",
        "BrokerAdapterName": "Statistics"
    },
    {
        "TopicName": "humidity",
        "BrokerAdapterName": "Solace"
    },
```

TABLE 3-continued

Sample Topic Mapping Configuration

```
    {
        "TopicPatternPrefix": "/temperatures/",
        "BrokerAdapterName": "Solace"
    }
]
```

TopicName is an MQTT topic name without wildcards; if a MQTT client subscribes to this topic name the subscription is forwarded to the mapped broker. TopicPatternPrefix is a prefix that is matched against incoming MQTT topic patterns of subscriptions: if they match the subscription is forwarded to the mapped broker. BrokerAdapterName is the name of the broker adapter that the subscription is forwarded to. Configuration of broker adapters has been described further above.

6. Topic Permissions

In some examples, access control lists (ACLs) can be used on the messaging gateway to restrict publish or subscribe requests to certain topics or levels.

7. Special Topic Names

In some examples, a special-purpose broker such as a Statistics broker adapter can accept subscriptions to a special topic name $SYS/statistics. Subscribers can receive a message with a UTF-8 payload containing information about an operating message gateway or message gateway instance.

XVII. Additional Features

1. Messaging Gateway:

In some examples, a messaging gateway is available as a service on the HANA Cloud Platform (HCP) or another cloud environment, and offers messaging endpoints (e.g. MQTT) for IoT/Web Messaging—messaging from Things or devices into the cloud environment, and acts as a dispatcher or gateway to do messaging with third party messaging middleware systems (e.g. from Solace Systems).

The messaging gateway can scale for high message volumes and high number of concurrent message connections (e.g. for IoT) and can be suitable for "accept any volume" service requirements. The messaging gateway can provide tiered Quality of Service, including guaranteed delivery (at least once), delivery exactly once, delivery exactly once and in order, to meet varying service requirements including "ensure exact delivery." The messaging gateway can handle message bursts, for example from financial markets, and can be suitable for "accept any peak" service requirements. The client-side protocols can be tailored and chosen specifically for IoT applications. In some examples, open, standardized APIs can be used, avoiding vendor lock-in and providing a truly universal messaging environment.

The messaging gateway can be implemented with no persistency, or in other words no storage of messages beyond transit time through the messaging gateway and no possibility of message retransmission, other than what is built into certain network communication protocols. In other examples, persistency can be supported, including by a service such as the Hana Cloud Platform (HCP) persistence service (e.g., a Sybase Adaptive Server Enterprise (ASE) or a SAP HANA database), allowing a greater depth of functionality from the messaging gateway in support of dedicated client queues and varying QoS requirements among different devices subscribed to a topic.

2. Application Lifecycle

A Messaging Gateway application can be deployed as an HCP application for every customer in a dedicated account managed by a service provider. The application can run as a single instance or as a multi-instance distributed application with redundancy and high availability, with considerations for synchronization as discussed above. In some examples, synchronized instances can be used to offer zero-downtime updates. In some examples, client connections can be migrated prior to update of an instance.

3. Monitoring and Alerting

A messaging gateway application can be monitored, for example with standard functions in HCP for predefined application health and availability checks, e.g. average response time, CPU load and memory usage. Additional health checks can also be used. For each health check, a Java MBean can be implemented which can be hooked as a JMX check into standard HCP monitoring.

Table 4 provides an overview of some exemplary health checks

TABLE 4

| Name | JMX Counter | Description | JMX Check (Alert/Warning) |
|---|---|---|---|
| ApplicationInfo | application info | Shows the current version of the deployed Messaging Gateway | No |
| SessionEvents | connection-state | Checks backend connectivity of the messaging gateway to the messaging backbone | No |
| AccountStatistics | number-of-clients | Number of clients connected to the Messaging Gateway | Yes - threshold based |
| | number-of-subscriptions | Number of current subscriptions to Backbone | Yes - threshold based |
| | number of subscriptions per client | Number of subscriptions drilled down by client id | No |
| AsyncAgent-Statistics | largest-pool-size | Max number of threads in Thread Pool used | No |
| | completed-task-count | Number of completed tasks | No |
| | max-queue-size | Current size of Thread Queue | No |
| | rejected-task-count | Number of rejected tasks | No |

In some examples, JMX is configured to automatically check for warnings or critical errors and create alerts. An alert email can be sent to an administration server or console, or to another destination, and can include recommendations for action.

4. Session Aging

In some examples, there is no limit for session live time. In some examples, an inactivity timeout can be defined according to the MQTT protocol specification. An MQTT client can provide KeepAlive information within seconds after the first connection packet, where KeepAlive is a maximum allowed time interval between completion of one control packet transmission from the client and the beginning of the next. The inactivity or idle connection timeout can be calculated as 150% of the KeepAlive time. In some examples, a default value such as 90 seconds (corresponding to KeepAlive of 60 s) can be used.

5. Message Size Restrictions

In order to prevent denial of service attacks, in certain examples, packet sizes of communication packages are restricted. Some systems can have a default packet size e.g. for WebSocket. As an example, Tomcat has a default message buffer size of approximately 8 kB. In certain examples, the default message buffer size value can be overridden during application deployment.

6. Denial of Service Prevention

In certain circumstances, for example without an HTTP upgrade handshake authentication option, a client could open a WebSocket connection without sending a valid MQTT Connect packet. To avoid this, an inactivity timeout can be set as short as possible between opening the WebSocket Session and sending a first connect packet.

7. Transport Encryption

In some examples, communication channels such as WebSockets, or between a messaging gateway and a broker appliance can be encrypted, for example using TLS (Transport Layer Security).

8. Configuration of Protocol Adapters—Gateway Client Side

Table 5 shows a sample of a protocol adapter configuration block.

TABLE 5

Sample Protocol Adapter Configuration

[
  {
    "ProtocolType" : "WebSocketMqtt",
    "ProtocolConfiguration" : {
      "ListenerPort" : 8090,
      "MaxRawMessageSizeBytes": 1000000,
      "MaxConnectionInputBufferSizeBytes": 10000000,
      "MaxConnectionOutputBufferSizeBytes": 10000000,
      "MaxConnectionTimeUntilLogonSeconds": 60,
      "MaxConnectionIdleTimeSeconds": 0,
      "MaxConnectionInboundBytesPerMinute": 0
    }
  },
  {
    "ProtocolType" : "Mqtt",
    "ProtocolConfiguration" : {
      "PortIsFixed": true,
      "ListenerPort" : 8091,
      "MaxRawMessageSizeBytes": 1000000,
      "MaxConnectionInputBufferSizeBytes": 10000000,
      "MaxConnectionOutputBufferSizeBytes": 10000000,
      "MaxConnectionTimeUntilLogonSeconds": 60,

TABLE 5-continued

Sample Protocol Adapter Configuration

```
        "MaxConnectionIdleTimeSeconds": 0,
        "MaxConnectionInboundBytesPerMinute": 0
      }
    }
]
```

ProtocolType can be Mqtt or WebSocketMqtt. ListenerPort is the TCP port for incoming connections. PortIsFixed (optional) is used with Cloud Foundry and marks ports that are not obtained from the PORT environment variable. To prevent multiple protocol adapters from using the same port, in certain examples at most one non-fixed port can be allowed. MaxRawMessageSizeBytes is a maximum size of a raw incoming message (0 can mean unlimited). MaxConnectionInputBufferSizeBytes is a maximum size of the input buffer of each MQTT connection (this parameter should be larger than MaxRawMessageSizeBytes; 0 can mean unlimited). MaxConnectionOutputBufferSizeBytes is a maximum size of the input buffer of each MQTT connection (this parameter should be larger than MaxRawMessageSizeBytes; 0 can mean unlimited). MaxConnectionTimeUntilLogonSeconds is a maximum time allowed to a client for submitting an MQTT connect packet (0 can mean unlimited). MaxConnectionIdleTimeSeconds is a maximum time a client can remain connected without submitting a message (e.g. MQTT ping) (0 can mean unlimited). MaxConnectionInboundBytesPerMinute is the maximum number of bytes a client can be allowed to send within a minute (0 can mean unlimited).

9. Configuration of Protocol Adapters—Broker Side

Table 6 shows a sample of a broker adapter configuration block.

TABLE 6

Sample Broker Adapter Configuration

```
[
  {
    "BrokerAdapterName": "Statistics",
    "BrokerType": "Statistics",
    "BrokerConfiguration": {
    }
  },
  {
    "BrokerAdapterName": "FlowProbe",
    "BrokerType": "FlowProbe",
    "BrokerConfiguration": {
    }
  },
  {
    "BrokerAdapterName": "Kafka",
    "BrokerType": "Kafka",
    "BrokerConfiguration": {
      "ServiceBinding": "user-provided/kafka_service",
      "ZookeeperHost": "10.1.2.3",
      "ZookeeperPort": 9092,
      "MaxOutboundQueueElements": 1000,
      "MaxOutboundQueueSizeBytes": 1000000,
      "TopicsToCreate": [
        "test"
      ]
    }
  },
  {
    "BrokerAdapterName": "Solace",
    "BrokerType": "Solace",
    "BrokerConfiguration": {
      "Host": "10.1.2.4",
      "Port": 55555,
```

TABLE 6-continued

Sample Broker Adapter Configuration

```
      "VPN": "vpn",
      "User": "user",
      "Password": "pwd",
      "MaxOutboundQueueElements": 1000,
      "MaxOutboundQueueSizeBytes": 1000000
    }
  },
  {
    "BrokerAdapterName": "Rabbit",
    "BrokerType": "AMQP09",
    "BrokerConfiguration": {
      "ServiceBinding": "rabbitmq/myrabbitmq",
      "Host": "10.1.2.5",
      "Port": 5672,
      "User": "user",
      "Password": "pwd",
      "MaxOutboundQueueElements": 1000,
      "MaxOutboundQueueSizeBytes": 1000000
    }
  }
]
```

BrokerAdapterName should be a unique name Example values for BrokerType include Statistics, FlowProbe, Kafka, Solace, or AMQP09. BrokerConfiguration depends on the broker type. For Kafka brokers, optional ServiceBinding parameter is used with CloudFoundry and denotes the path of a bound Kafka service; either ServiceBinding or (ZookeeperHost, ZookeeperPort) should be specified (if no binding exists in the environment, the other parameters are used as fallback). Optional parameter ZookeeperHost is the host of the Zookeeper of the Kafka cluster, and optional parameter ZookeeperPort is the port of the Zookeeper of the Kafka cluster. Optional parameter MaxOutboundQueueElements is the maximum number of messages in an outbound queue of a broker adapter. Optional parameter MaxOutboundQueueSizeBytes is the maximum number of bytes (of message payloads) in an outbound queue of a broker adapter. Optional parameter TopicsToCreate is a list of topic names that are created on startup.

For Solace brokers, Host is the host of the Solace broker, Port is the port of the Solace broker, VPN is the Solace VPN which is used, User is the Solace user, and Password is the password of the Solace user. Optional parameter MaxOutboundQueueElements is the maximum number of messages in the outbound queue of the broker adapter. Optional parameter MaxOutboundQueueSizeBytes is the maximum number of bytes (of message payloads) in an outbound queue of a broker adapter.

For AMQP09 brokers, optional parameter ServiceBinding is used with CloudFoundry and denotes the path of a bound AMQP service (e.g. RabbitMQ) supporting AMQP 0.9.1; either ServiceBinding or Host, Port, User, and Password should be specified; if no binding exists in the environment the other parameters are used as fallback. Optional parameters Host and Port are the host and port of the AMQP broker respectively. Optional parameter User is the broker user, and Password is the User's password. Optional parameters MaxOutboundQueueElements and MaxOutboundQueueSizeBytes are the maximum number of messages and the maximum number of message payload bytes in an outbound queue of a broker adapter.

XVIII. A Generalized Computer Environment

Figure 17:
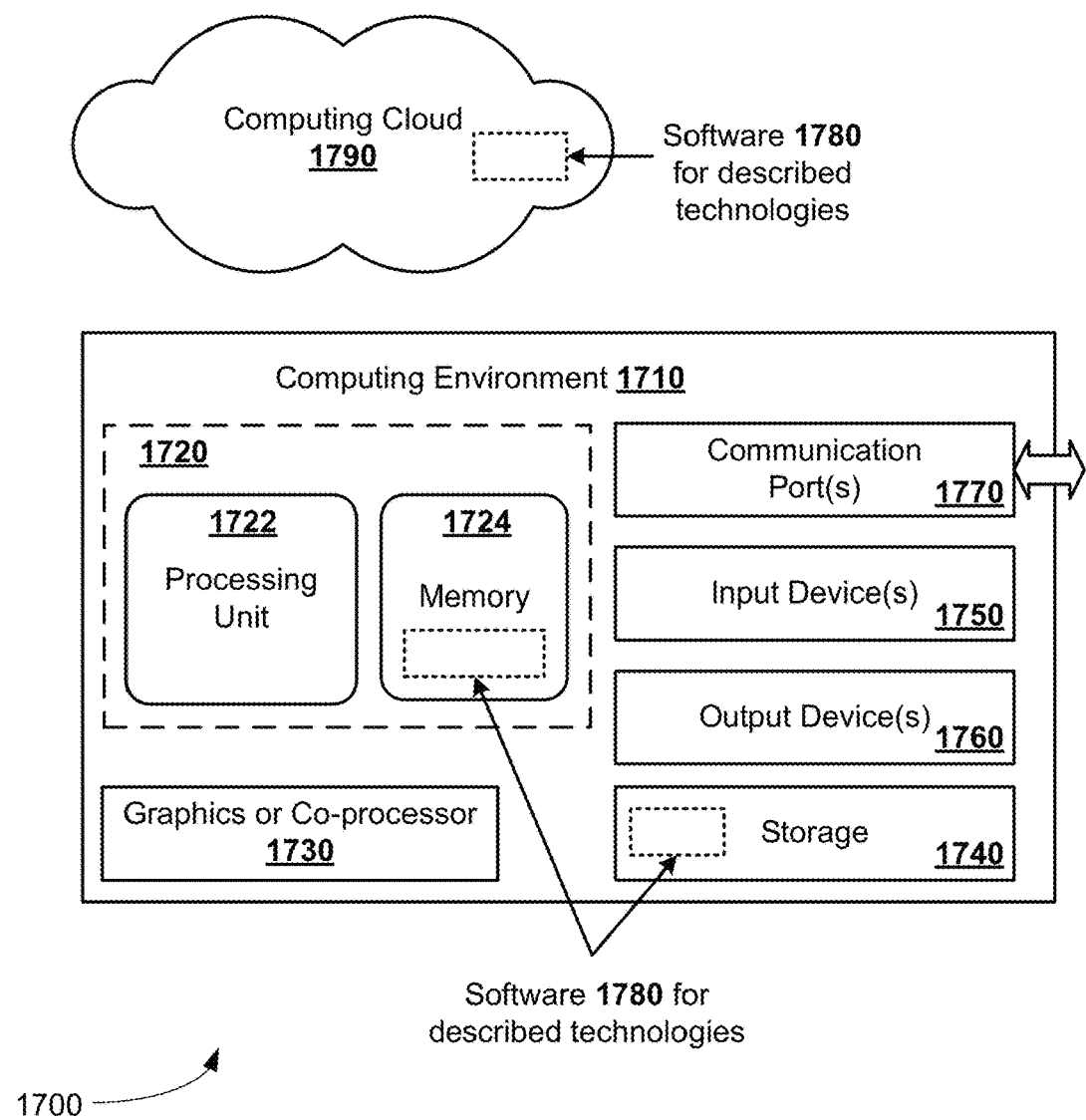
FIG. 17 is a diagram schematically depicting an example computing environment suitable for implementation of disclosed technologies.

FIG. 17 illustrates a generalized example of a suitable computing system 1700 in which described examples, techniques, and technologies, including construction, deployment, operation, and maintenance of a messaging meta broker gateway, can be implemented. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing components of messaging meta broker gateway, and various other architectures, components, handlers, managers, modules, and repositories described herein. Processing unit 1722 can be a general-purpose central processing unit (CPU), a processor in an application-specific integrated circuit (ASIC), or any other type of processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730. The memory 1724 can also store database data, including some or all of topic mapping repository, subscription mapping repository, or configuration data. The memory 1724 can also store some or all of broker, client, connection, or session data, and other configuration and operational data.

A computing system 1710 can have additional features, such as one or more of storage 1740, input devices 1750, output devices 1760, or communication ports 1770. An interconnection mechanism (not shown) such as a bus, controller, or network interconnects the components of the computing environment 1710. Typically, operating system software (not shown) provides an operating environment for other software executing in the computing environment 1710, and coordinates activities of the components of the computing environment 1710.

The tangible storage 1740 can be removable or non-removable, and includes magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein, or some or all of topic mapping repository, subscription mapping repository, or configuration data, or other configuration and operational data.

The input device(s) 1750 can be a mechanical, touch-sensing, or proximity-sensing input device such as a keyboard, mouse, pen, touchscreen, or trackball, a voice input device, a scanning device, or another device that provides input to the computing environment 1710. The output device(s) 1760 can be a display, printer, speaker, optical disk writer, or another device that provides output from the computing environment 1710.

The communication port(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example and not limitation, communication media can use an electrical, optical, RF, acoustic, or other carrier.

In some examples, computer system 1700 can also include a computing cloud 1790 in which instructions implementing all or a portion of the disclosed technology are executed. Any combination of memory 1724, storage 1740, and computing cloud 1790 can be used to hold software instructions and data of the disclosed technologies.

The present innovations can be described in the general context of computer-executable instructions, such as those included in program modules, being executed in a computing system on a target real or virtual processor that is ultimately carried out in hardware. Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware ultimately carried out in hardware, together with software implementing the functionality described herein.

XIX. An Example Cloud Computing Environment

Figure 18:
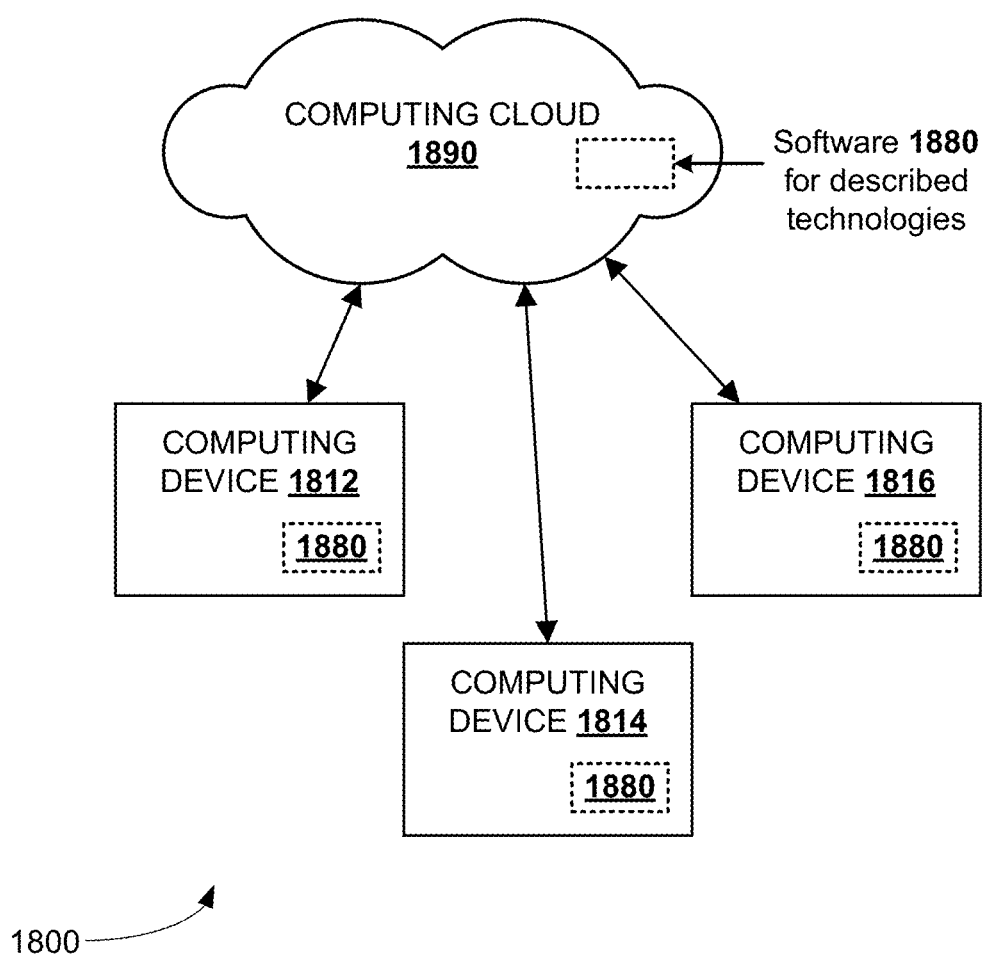
FIG. 18 is a diagram schematically depicting example computing devices operating in conjunction with a computing cloud for implementation of disclosed technologies.

FIG. 18 depicts an example cloud computing environment 1800 in which the described technologies can be implemented. The cloud computing environment 1800 comprises a computing cloud 1890 containing resources and providing services. The computing cloud 1890 can comprise various types of cloud computing resources, such as computer servers, data storage repositories, networking resources, and so forth. The computing cloud 1890 can be centrally located (e.g., provided by a data center of a business or organization) or distributed (e.g., provided by various computing resources located at different locations, such as different data centers and/or located in different cities or countries).

The computing cloud 1890 can be operatively connected to various types of computing devices (e.g., client computing devices), such as computing devices 1812, 1814, and 1816, and can provide a range of computing services thereto. One or more of computing devices 1812, 1814, and 1816 can be computers (e.g., server, virtual machine, embedded systems, desktop, or laptop computers), mobile devices (e.g., tablet computers, smart phones, or wearable appliances), or other types of computing devices. Connections between computing cloud 1890 and computing devices 1812, 1814, and 1816 can be over wired, wireless, and optical links, or any combination thereof, and can be short-lived or long-lasting. These connections can be stationary or can move over time, being implemented over varying paths and having varying attachment points at each end. Computing devices 1812, 1814, and 1816 can also be connected to each other.

Computing devices 1812, 1814, and 1816 can utilize the computing cloud 1890 to obtain computing services and perform computing operations (e.g., data processing, data storage, and the like). Particularly, software 1880 for performing the described innovative technologies can be resident or executed in the computing cloud 1890, in computing devices 1812, 1814, and 1816, or in a distributed combination of cloud and computing devices.

XX. General Considerations

As used in this application, the singular forms "a," "an," and "the" include the plural forms unless the context clearly dictates otherwise. Additionally, the terms "includes" and "incorporates" mean "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "analyze," "apply," "determine," "display," "estimate," "generate," "produce," and "use" to computer operations in a computer system. These terms are high-level abstractions of the actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smart phones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The term computer-readable storage media does not include signals and carrier waves. In addition, the term computer-readable storage media does not include communication ports (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C#, Curl, Dart, Fortran, Java, JavaScript, Julia, Lisp, Matlab, Octave, Perl, Python, R, Ruby, SAS, SPSS, SQL, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention can be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method comprising:
   establishing a plurality of connections between a messaging meta broker gateway and respective messaging meta broker clients, wherein the messaging meta broker gateway defines a persistless messages layer through which the messaging meta broker clients are coupled to a plurality of message brokers in a publish-subscribe messaging environment, and wherein the plurality of message brokers are configured to provide persistent storage of published messages;
   at the messaging meta broker gateway, processing subscription requests and persistlessly transporting published messages received from the messaging meta broker clients, and subscribed messages received from the message brokers, across the messaging meta broker gateway, wherein the processing comprises:
      responsive to receiving a first subscription request having a specified topic identifier from a first requesting messaging meta broker client over one of the connections, sending a second subscription request from the messaging meta broker gateway to one or more message brokers, among the plurality of message brokers, on behalf of the requesting messaging meta broker client; and
      responsive to receiving, from a subsequent requesting messaging meta broker client, a subsequent subscription request having a same topic identifier as that specified in the first subscription request, adding the subsequent subscription request to a subscription mapping repository in lieu of sending a subscription request to any message broker for the subsequent subscription request; and
   wherein the persistlessly transporting comprises:
      receiving a plurality of the published messages, including a first published message, from the messaging meta broker clients, wherein the published messages comprise respective topic identifiers;
      persistlessly routing the plurality of published messages to respective message brokers, among the plurality of message brokers connected to the messaging meta broker gateway, by the topic identifiers, according to a topic mapping repository; and
      responsive to receiving a first one of the subscribed messages from any of the one or more message brokers within scope of the specified topic identifier, persistlessly fanning the first subscribed message out to a plurality of subscribing messaging meta broker clients indicated by the subscription mapping repository, wherein the plurality of subscribing messaging meta broker clients comprise the first requesting client and the subsequent requesting client;
      wherein the first subscribed message has message and topic fields that are identical to message and topic fields of the first published message.

2. The method of claim 1, wherein:
   the plurality of message brokers accept messages of particular, different messaging protocols; and
   the messaging meta broker gateway translates messages received from the messaging meta broker clients into the different messaging protocols of the plurality of message brokers.

3. The method of claim 1, wherein:
   the first subscription request is of a first messaging protocol;
   at least one message broker of the one or more message brokers accepts subscription requests in a second, different messaging protocol; and
   the messaging meta broker gateway translates the first subscription request from the first messaging protocol into the second messaging protocol before sending the second subscription request to the message broker.

4. The method of claim 1, wherein:
   routing the plurality of published messages among a plurality of message brokers by the topic identifiers according to a topic mapping repository also maps the plurality of published messages to at least one data repository according to the topic mapping repository.

5. The method of claim 1, wherein:
   choosing the one or more message brokers to which the second subscription request is sent based on the topic identifier according to the topic mapping repository.

6. The method of claim 1, wherein:
   the messaging meta broker relays messages from the messaging meta broker clients to the message brokers without persisting the messages in a queue and without persisting the messages in a database.

7. The method of claim 1, wherein:
   the messaging meta broker gateway is one of a plurality of messaging meta broker gateways, in the persistless layer, that cooperate to handle a flow of incoming messages; and
   a total number of the messaging meta broker clients coupled through the messaging meta broker gateways to a given one of the plurality of message brokers exceeds a connection capacity of the given message broker.

8. The method of claim 7 wherein:
   the topic mapping repository is a common topic mapping repository shared among the plurality of messaging meta broker gateways.

9. The method of claim 7 wherein:
   mirror replicas of the topic mapping repository are held by respective ones of the plurality of messaging meta broker gateways.

10. The method of claim 1, further comprising:
    before the sending of the second subscription request from the messaging meta broker gateway to the one or more message brokers on behalf of the requesting messaging meta broker client, replacing a client identifier with an identifier of the messaging meta broker gateway in the second subscription request.

11. The method of claim 1, wherein the messaging meta broker gateway supports published messages from the messaging meta broker gateway clients of the following messaging protocols: AMQP, MQTT, MQTT over WebSocket, OpenMAMA, and REST.

12. The method of claim 1 wherein:
    the topic mapping repository maps topic identifiers to one or more respective of the message brokers.

13. The method of claim 12 wherein:
    the topic mapping repository supports topic identifier patterns.

14. The method of claim 1, further comprising:
responsive to receiving the first subscription request from the requesting messaging meta broker client, determining that the specified topic identifier is outside scope of any pre-existing entries in the subscription mapping repository;
based on the specified topic identifier, identifying within the topic mapping repository one or more sources, among the plurality of message brokers, persisting messages matching the specified topic identifier, wherein the identified one or more sources are the one or more message brokers to which the second subscription request is sent; and
adding at least one entry to the subscription mapping repository associating the requesting messaging meta broker client with the specified topic identifier.

15. The method of claim 1, further comprising:
establishing a connection between a message broker and the messaging meta broker gateway, wherein the establishing is initiated by the messaging meta broker gateway.

16. A computer-implemented meta broker gateway system for publish-subscribe messaging, comprising:
a plurality of computing nodes comprising one or more processors and memory coupled thereto;
a common topic mapping repository shared among the plurality of computing nodes;
a plurality of internal network connections between the computing nodes;
respective ones of the plurality of computing nodes configured to host respective instances of a messaging meta broker gateway comprising:
a messaging meta broker gateway client-facing protocol adapter subsystem comprising a plurality of protocol adapters supporting respective messaging meta broker gateway client protocols, each protocol adapter being configured to support one or more messaging meta broker gateway client connections according to the respective client protocol;
a broker-facing interface subsystem comprising a plurality of broker adapters supporting respective broker messaging protocols, each broker adapter being configured to support one broker connection, to a respective one of a plurality of message brokers, according to the respective broker messaging protocol; and
a publish-subscribe subsystem comprising:
a subscription mapping repository;
a publish engine configured to route published messages received over the messaging meta broker gateway client connections to corresponding broker adapters according to the topic mapping repository;
a subscribe engine configured to route subscribed messages received over the broker connections to corresponding messaging meta broker gateway client connections according to the subscription mapping repository; and
a subscription management engine configured to receive subscription requests forwarded from the messaging meta broker gateway client connections by the messaging meta broker gateway client-facing protocol adapter subsystem, and forward selected ones of the received subscription requests to respectively selected broker adapters at least partly based upon access to the topic mapping repository and the subscription mapping repository;
wherein traffic between the broker-facing interface subsystem and any given one of the plurality of message brokers does not pass through any other message broker of the plurality of message brokers;
wherein the published messages comprise respective topic and message fields; and
wherein the subscription requests comprise respective topic fields but no message fields.

17. The computer-implemented meta broker gateway system of claim 16, wherein:
at least one of the broker adapters is connected to an interface to a data repository.

18. The computer-implemented meta broker gateway system of claim 16, wherein the computer-implemented meta broker gateway system is coupled to client devices which are sensors or controllers of an Internet-of-Things (IoT).

19. One or more non-transitory computer-readable media storing instructions that, when executed by a computing system, cause the computing system to perform a method comprising:
accepting a plurality of first connection requests from respective client devices;
establishing a plurality of concurrent client connections for the first connection requests;
initiating a plurality of connections to a messaging backbone comprising one or more message brokers and one or more data repositories in a persisted messages layer, wherein the persisted messages layer retains messages and provides persistent storage beyond a time duration required for receiving, processing, and/or transmitting messages;
configuring a topic mapping repository with entries comprising associations between (a) one or more topics and/or topic patterns, and (b) respective messaging meta broker destinations, wherein the messaging meta broker destinations comprise one or more of the message brokers or data repositories;
initializing a subscription mapping repository; and
performing persistless message routing between the client devices and the messaging backbone, wherein the performing comprises:
receiving a first published message from a first client device using a first messaging protocol over a first client connection among the concurrent client connections, the first published message having a first topic;
accessing the topic mapping repository to determine, based at least partly on the first topic, at least one message destination for the first published message, from among the messaging meta broker destinations;
forwarding the first published message to the at least one message destination;
wherein forwarding includes translating the first published message from the first messaging protocol to a different second protocol for compatibility with one or more of the message destinations;
receiving, from a second client device, a first subscription request comprising a given topic pattern, of the topic patterns, and identifying the second client device as a subscriber;
accessing the topic mapping repository to determine one or more sources hosting a second topic, of the topics, matching the given topic pattern, from among the one or more message brokers;

storing, in the subscription mapping repository, a record comprising an identifier of the second client device and an identifier of the second topic; and issuing one or more second subscription requests to the one or more sources;

wherein the persistless message routing between a given client device and any given message broker or data repository of the messaging backbone is performed through the computing system without passing through any other message broker or data repository of the messaging backbone.

* * * * *